United States Patent
Paliy

(10) Patent No.: US 9,186,909 B1
(45) Date of Patent: Nov. 17, 2015

(54) METHOD AND SYSTEM OF LENS SHADING COLOR CORRECTION USING BLOCK MATCHING

(71) Applicant: INTEL CORPORATION, Santa Clara, CA (US)

(72) Inventor: Dmytro Paliy, Tampere (FI)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/498,271

(22) Filed: Sep. 26, 2014

(51) Int. Cl.
*B41J 29/393* (2006.01)
*B41J 2/47* (2006.01)

(52) U.S. Cl.
CPC .................................... *B41J 2/473* (2013.01)

(58) Field of Classification Search
CPC ............. B41J 2/473; B41J 2/451; B41J 2/435
See application file for complete search history.

(56) References Cited

U.S. PATENT DOCUMENTS 6,906,739 B2 * 6/2005 Suzuki et al. ................. 347/233

OTHER PUBLICATIONS

Paliy et al., "Techniques to Reduce Color Artifacts in a Digital Image", U.S. Appl. No. 14/182,824, filed Feb. 18, 2014, 62 pages.
OmniVision CRA Correction: Matching Sensors to Lenses for Better Imaging Systems, OmniVision the clear advantage; Jun. 2009 Power Point presentation, 16 pages.

* cited by examiner

*Primary Examiner* — Juanita D Jackson
(74) *Attorney, Agent, or Firm* — Lynch Law Patent Group, P.C.

(57) ABSTRACT

A system, article, and method to provide lens shading color correction using block matching.

25 Claims, 12 Drawing Sheets frame k frame k+1

METHOD AND SYSTEM OF LENS SHADING COLOR CORRECTION USING BLOCK MATCHING

BACKGROUND

Electronic devices such as smartphones, tablets, and wearable computers are being miniaturized for the user's convenience, which in turn involves the miniaturization of electronic components in such devices. This includes digital cameras capable of producing digital images. While reducing form factors may increase user convenience, it often does so by sacrificing performance or quality. With respect to digital cameras, slimmer form factors place lenses and filters so close to the camera's sensors that resulting digital images often have color artifacts and discolorations. Thus, better quality digital images are desired.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
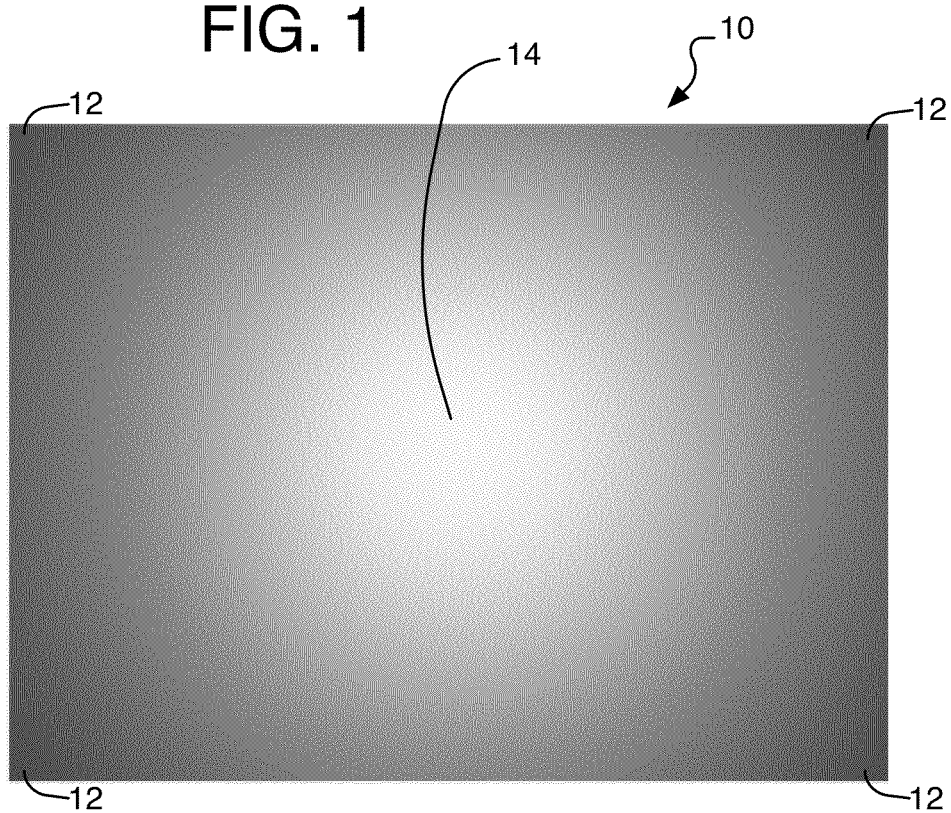
FIG. 1 is an illustration of an image with light attenuation.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, webcams, video cameras, video game panels or consoles, set top boxes, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein may also be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods to provide lens shading color correction with block matching.

Figure 2:
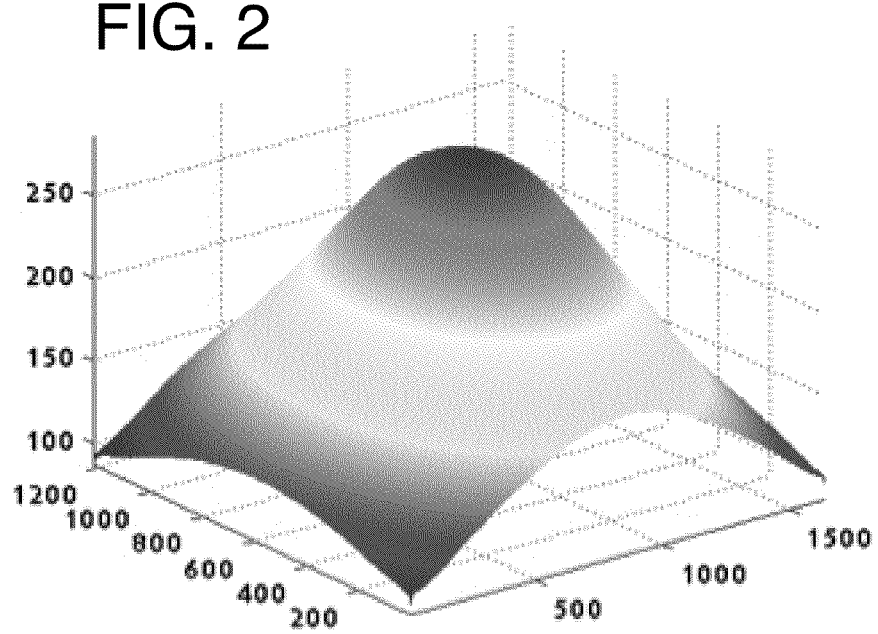
FIG. 2 is a chart showing light attenuation of the image.
Figure 3:
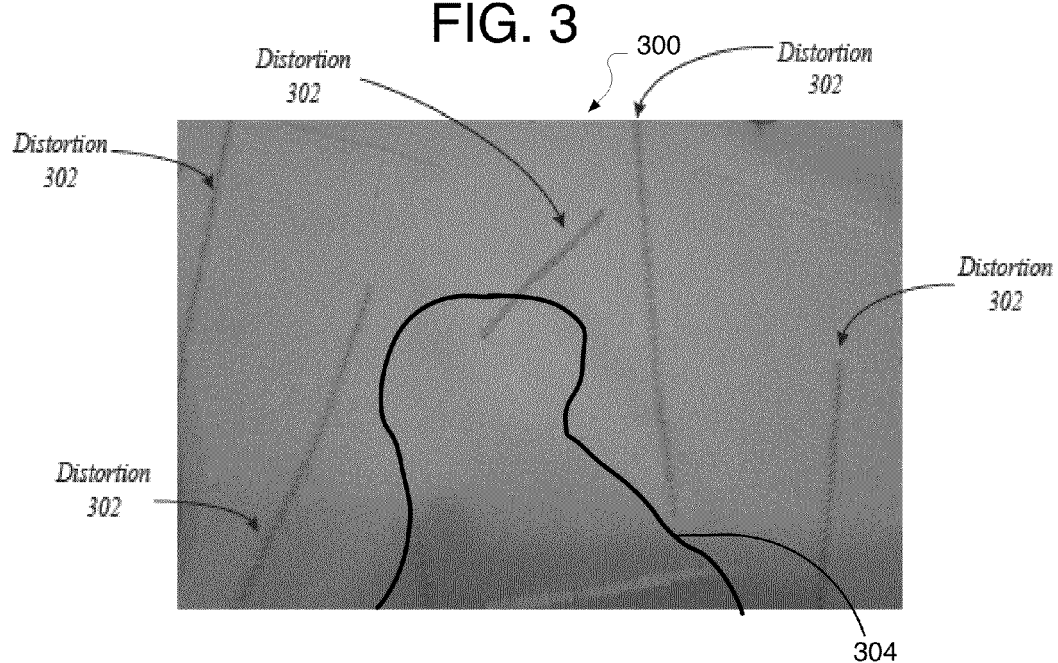
FIG. 3 is an image with lens shading color artifacts.

A multi-function electronic device that has the ability to capture images such as a smartphone, mobile phone, tablet, laptop, and so forth with a mobile camera module may often have a form factor with dimensions sized to easily fit in a palm of an average hand of a user. In such cases, the small electronic device may have a depth so small it may be measured in millimeters (mm). For instance, conventional smartphones may easily have a representative depth of 7.6 mm or thinner. When a device of such narrow depth incorporates an image capture module, such as a digital camera, it necessarily decreases a distance between camera optics and an image sensor. The decreased distance causes light to strike various portions of the image sensor in a non-uniform manner, such as concentrating light towards a center of the image sensor and attenuating light towards the outer edges of the image sensor as shown on the image 10 (FIG. 1) produced with a sensor and using a flat test area. As shown in FIG. 1, corner regions 12 of image 10 are darker than a central region 14 of image 10. This suggests that light attenuation due to optical lens shading is greater with respect to corner regions 12 than it is with respect to central region 14. This attenuation may not be static throughout color planes which results in severe color distortions. Typical results are digital images that are brighter in the center and darker near the edges as mentioned, as well as artificial colors, and attenuation with respect to the original scene. FIG. 2 shows one color plane from FIG. 1 where the vertical axis is brightness, and the base shows pixel coordinates. The light is brightest in the center and reduces significantly toward the outer corners. FIG. 3 shows that unequal light attenuation, and respectively color distortions, even occur in high end devices such as a smartphone. Distortions 302 are shown on the image 300 in attempts to correct the color as well as color artifact area (304) (which may be tinted too red in this example) that remains despite such corrections. Thus, a problem still exists with image quality of even well-known top-end devices as shown in FIG. 3.

More specifically, since a majority of digital imaging sensors are equipped with CFAs (color filter arrays) to reproduce color information in digital images, as a result, such attenuation varies in different color channels, which results in severe color degradation when the image is reconstructed improperly. This attenuation varies depending on light spectrum, module design (geometry and optics), IR-cut-off (infrared) filter, sensor design, and potentially other factors. For one factor, when the optics (or filter) and sensor plane are brought closer together in these small devices, this creates a relatively sharp chief ray angle (CRA) relative to the sensor plane, and depending on the design of the part that holds the sensor, not as many light rays compared to some ideal arrangement may have a clear path to the sensor. Since such distortion can be measured objectively and it is visible to users, the removal of these distortions is an important criterion for image quality.

To correct for such non-uniformity, an image capture device may implement various lens shading correction (LSC) algorithms to compensate. An LSC algorithm may utilize one or more correction LSC tables with correlated color temperature (CCT) factors associated with them to perform such correction. Once an LSC table is formed (or more accurately selected among pre-stored LSC tables), it is applied to pre-processed image data to make the corrections before the data is provided to an encoder or before the image is displayed for example. The conventional correction processes using LSC tables, however, still are too inaccurate. They may cause unequal attenuation, and in turn visible distortions. Previous solutions were based on use of hue or saturation histograms (global statistics analysis). A better solution is based on local color deviation analysis (local statistics analysis) which is disclosed in U.S. patent application Ser. No. 14/182,824, published on May 28, 2015 as U.S. Publication No. 2015/0146979 A1, and is explained in greater detail below.

One of the principle challenges in solving lens shading problems during camera run-time is in understanding which part of an image can be utilized best in calculation of color distortion metrics. Specifically, the more accurately a distortion (such as distortions 302) can be identified and measured, the better chances the correct LSC table can be selected to properly compensate for the distortion. Color distortions are typically measured by a mean square error (MSE) with respect to origin in a hue, saturation and value (HSV) color space projected to a hue/saturation plane in a block of a corrected and white-balanced image. It has been found that the distortions are more easily identified and measured in flat, achromatic areas of the image (also referred to as smooth areas). Thus, the simplest and most efficient way to find distortions is in a flat-field image. Such an image may be acquired with either diffusive glass or an integrating sphere. In such a case, the solution is rather straightforward. Correction is performed by reverting the observation itself. In other words, some preferred color or brightness coefficient is determined, and the darker areas are made lighter and the lighter areas are made darker by the coefficient. However, such an approach only may be feasible in a test laboratory environment, and not applicable when correcting typical images that may or may not have wide brightness and color variations.

Hence, a search may be performed for smooth or uniform areas on typical images and analyzed during run-time to enable calculation of distortion metrics. Such calculations require both sufficient data and properties described above to make a reliable decision about the LSC table selection. One solution to this problem was to divide the image into a number of rectangular blocks, such as 24 blocks where each block is a relatively large continuous area of the image. An error is calculated for each block based on hue and saturation value, each illuminant (or in other words, light source), and the size of the block. This error is then used to calculate a weight associated with LSC tables as described below. Important here, only some of the blocks are selected for use to ultimately select LSC tables even though errors are calculated for all of the blocks in the image. By one approach, a select number of the blocks with the lowest error(s) are then used to select the LSC tables. In the previous approach provided by U.S. patent application Ser. No. 14/182,824, published on May 28, 2015 as U.S. Publication No. 2015/0146979 A1, two to eight of the 24 blocks with the lowest error values are used for further calculations. This block selection operation was used because the smaller the error, the more likely the block provides a smooth portion of the image, or at least more smooth sections within the block. It was assumed that the blocks with the largest errors represented areas of an image with great variations in saturation and hue suggesting many edges between objects depicted in the block, and therefore, the block does not show a smooth area of the image.

Figure 4:
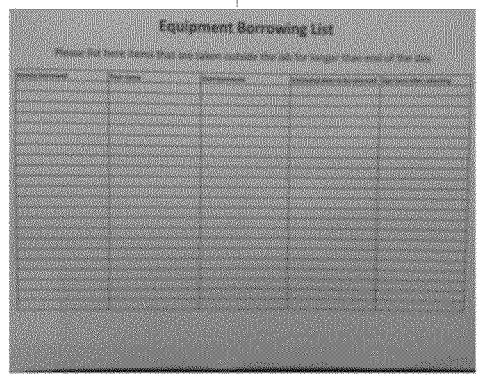
FIG. 4 is an image with texture that is difficult to provide correct shading.
Figure 5:
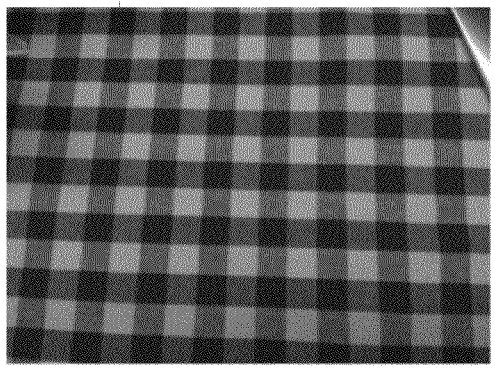
FIG. 5 is another image with texture that is difficult to provide correct shading.

This previous approach of block selection, however, still has problems with images that have complex textures where the smooth areas are not concentrated in one relatively large section of the image. For example, images with small repetitive textures are some of the most difficult for analysis. This includes image content such as tables or spread sheets on image 400 (FIG. 4) and with lines that divide rows and columns to form alternating patterns of dark and light regions on the image. Likewise, a checkered fabric pattern on an image 500 (FIG. 5) forms alternating patterns of white and color sections. The previous operations that use large blocks for analysis may not clearly have one block that represents a smooth area of the image, and in turn, the LSC table selection can become inadequate. In addition, the conventional segmentation solutions (for example, flood fill segmentation) that are limited to a continuous area of the image may provide inefficient or insufficient results, or may fail to provide any results, because an insufficient portion of the data of the smooth areas of the image are included in the selected segmented area or selected blocks.

To solve these problems, the approach disclosed herein uses a dynamic search in one or more video frames in a video sequence to form at least one cluster of blocks for a frame. The cluster of blocks represents a smooth uniform area of the image. A smooth uniform area refers to an area of the image with the smallest amount of edges, or in other words, without large jumps in luminance or color ratios. This may provide a much larger amount of image data for each cluster compared to the conventional methods. The blocks or areas that form the cluster are not necessarily connected, and may be included in the cluster regardless of where the block is located on the image. Thus, the blocks in the cluster are not necessarily in contact with each other, and the cluster need not have any certain shape.

The disclosed image modeling process includes selecting blocks for the cluster (also referred to herein as self-similarity block matching) when blocks have the same property such that the data of both blocks pass one or more criteria related to the image data. By one form, a reference area or block in the image (or more accurately in a statistics grid of image data) is compared to multiple blocks in the image. The statistics grid may be a grid of luminance values or color values or color ratios that are spaced on the grid to correspond to the position of blocks defined on the image. When the comparison satisfies similarity criterion, the two blocks are said to be of the same object, or of the same properties, and the found block is included in the cluster. The cluster of blocks is then used to find errors in hue and saturation for example, which in turn are used to find weights for the LSC tables. Selected ones of the weighted LSC tables are then provided to correct pre-processed images.

The approach described here may be referred to as a non-local solution since it incorporates benefits of both a global (histograms based solution) and local statistics analysis (by performing color distortion calculations described further below). Since the clustering arrangement uses more efficient data utilization compared to the conventional lens shading color correction methods, the quality of classification, run-time robustness, and increased scope of applicability are improved despite an increase in cost of computational complexity.

Figure 6:
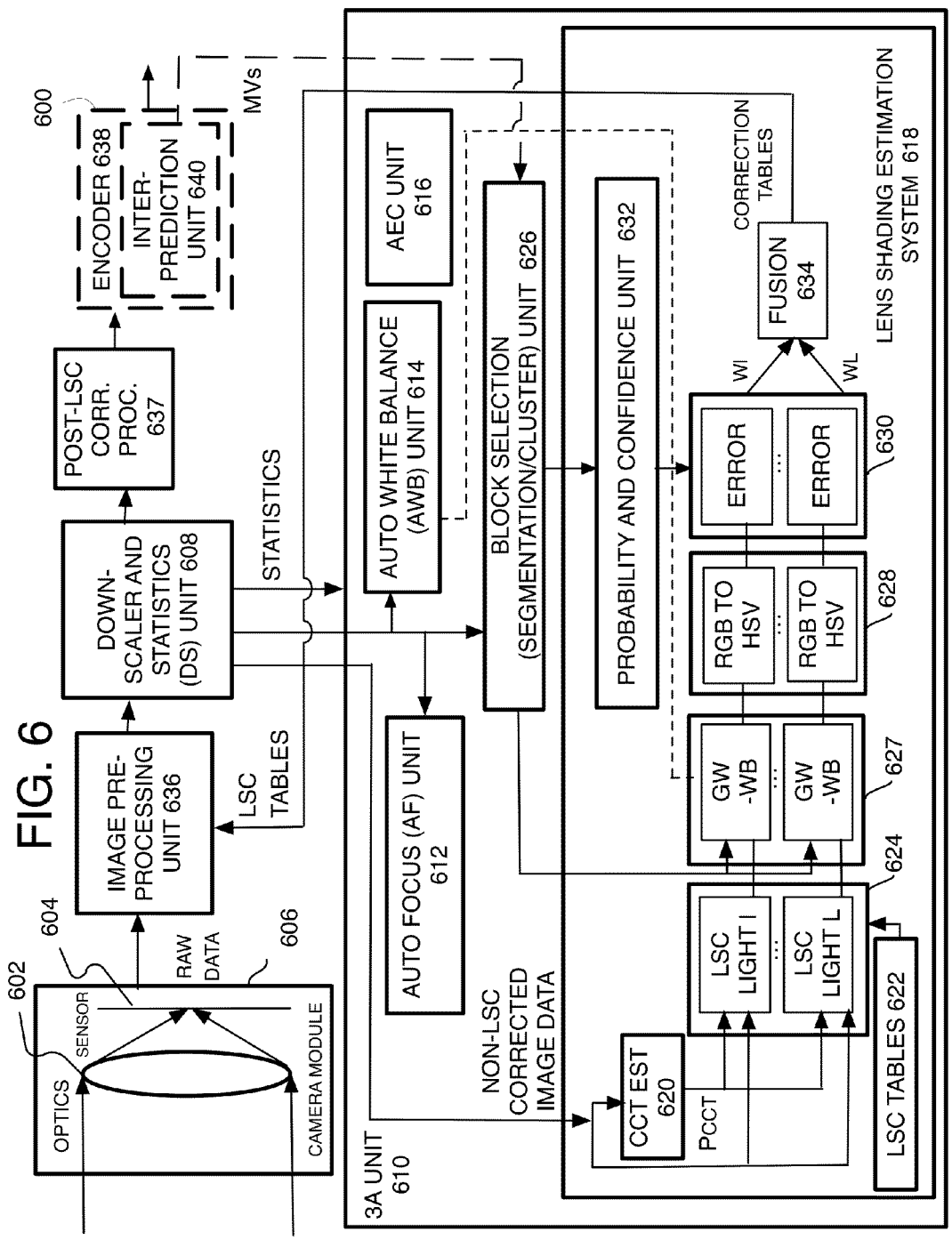
FIG. 6 is a schematic diagram of an image capture device for lens shading color correction.

Referring to FIG. 6, an image capture device or system 600 to process captured images and apply the lens shading color correction with self-similarity block searching is described. The image capture device 600 may be a stand-alone device, such as a digital camera, or may merely be a camera module on a device such as a smartphone. In the present example, the image capture device 600 may have a camera module 606 that has optics 602 and one or more image sensors 604, where each optic is paired with a corresponding image sensor 604. Each of the image sensors 604 may be based on any of a variety of technologies for capturing an image of a scene, including and not limited to charge-coupled device (CCD) semiconductor technology. Each of the optics 602 is made up of one or more lenses, mirrors, prisms, shutters, filters, etc. employed to convey images of a scene and to at least partly define the field of view of corresponding ones of the image sensors 604. The image sensors 604 and the optics 602 (whatever their quantity) are positioned and oriented relative to each other in a manner intended to provide each image sensor and optics pair with a field of view that overlaps field(s) of view of one or more of the other image sensor and optics pairs.

The image capture device 600 also may have a pre-processing unit 636 that receives raw image from the camera module 606 and performs black-level correction on the raw image data, upscales a LSC correction grid (or table) received from a lens shading estimation unit 618 described below, and upscales the grid to the size of image data, and multiplied in a point-wise manner.

A downscaler and statistics (DS) unit 608 will then use the LSC corrected image data to generate statistics for 3A, which comprises LSC corrected, AF statistics for auto-focus, and black-level corrected raw statistics. Thus, the DS unit 608 may provide both the LSC corrected data for 3A corrections as well as block matching, and the black-level corrected raw data to the lens shading estimation unit 618 for application of candidate LSC tables and lens shading estimations. In systems that do not provide the black-level-adjusted data to the 3A unit, the LSC corrected data from the downscaler may be reverted before it is used in lens shading estimation. The reversion may be performed by the downscaler or a separate module for such purpose. The DS unit 608 also is provided to downscale the raw data stream (or raw image information) from the camera module 606. The DS unit 608 also analyzes the downscaled image data to form statistics that may be used by the 3A unit 610. At the very least, the pre-processed image data should already be processed for black-level correction before lens shading estimation operations may begin. Lens shading estimation unit 618 expects statistics to be black-level corrected only. Hence, if the DS unit 608 assumes only one type of statistics as an output, which is LSC-corrected, then this correction shall be reverted and used as input to system 618 as mentioned above. Other 3A units may use LSC-corrected or AF statistics, or both. The preprocessed image may be a single image, or a sequence of images, such as from a video sequence. The preprocessed image may be received by the LSC estimation unit 618 in real-time, or in non-real time from a memory unit. Implementations are not limited in this context. Note that pre-processing and post-processing discussed herein are relative to the LSC shading estimation.

The 3A unit 610 has an automatic focus (AF) unit 612 to perform AF calculations to determine factors to move a camera lens into focus. An automatic white balance (AWB) unit 614 is provided to perform calculations to image data for white balance, and an automatic exposure (AE) unit 616 to provide factors to adjust exposure time for capturing an image. The 3A unit 610 also may have the lens shading estimation system or unit 618.

The LSC estimation unit 618 may use a correlated color temperature (CCT) estimate unit 620 to determine which of a set of LSC tables 622 are to be used for lens shading color correction for a current image. Specifically, a characterization phase is performed during design and assembly of the image capture device 600 before a correction phase. In the characterization phase, LSC tables 622 are created to cover most CCT value ranges for commonly used light illuminants. The LSC tables 622 are stored in a memory, such as a persistent storage, for later use during the estimation and correction phases. Role of system 618 is to decide when, and in which proportion, each LSC table 622 should be used to compensate shading of a digital image.

A correction phase may be performed in real-time, or run-time execution during use of the image capture device 600 and when data is streamed from the camera module 606. During the correction phase, the 3A unit 610 via the DS unit 608 may analyze the content from the streamed image data, and supplementary metadata. Examples of metadata may include, without limitation, auto-focus values, CCT estimate, time values, and so forth. The relevant data is provided to the 3A unit 610 by the DS unit 608. During the correction phase, the CCT estimate unit 620 is used to estimate one or more original light source types and initial selection of candidate LSC tables. The details for selecting candidate LSC tables is explained below.

The LSC estimation unit 618 also may include a block selection unit 626. The block selection unit 626 also may be referred to as a block matching unit, segmentation unit, or clustering unit as well. It will also be appreciated that the device 600 may have at least one LSC unit to perform both the operations of the LSC estimation unit 618 and block selection unit 626, such that both units 618 and 626 may be considered as part of one LSC correction unit, or any other variation. The block selection unit 626 may receive AF statistics, and provides approximation of flat smooth areas in the scene by using the AF statistics. The block selection unit 626 may output definitions of block clusters that represent the smooth areas. This may include a total area of the cluster (total number of pixels in the cluster) as well as the coordinates of the data in the cluster on an image. The coordinates may be used to obtain the hue and saturation values for the data in the cluster. The cluster size, and hue and saturation values, may be used to determine error values as explained below. Each image may have one or more clusters. The total amount of pixels from all of the clusters in an image should contain a sufficient amount of image data to provide a robust estimate of deviation between color samples (for example, recommended minimum of 100 pixels or other relevant value). The details for generating the clusters are provided below.

An initial (or candidate) LSC table unit 624 may be provided to identify the tables initially selected by the CCT estimate unit 620, and for further processing. Each set of the initial LSC tables for $Light_1, \ldots, Light_L$ (unit 624) as well as the image data of the blocks in the established clusters of an image may be provided to a grey-world white-balance (GW-WB) unit 627, which may be controlled by the AWB unit 614. The unit 627 applies white-balance calculations to the LSC corrected statistics of at least the clusters in the image to adjust the image data for white balancing in the clusters. A red/green/blue (RGB) to hue/saturation/value (HSV) convertor unit 628 is provided to convert the RGB values of the clusters in the image to HSV color space values for error calculations. An error unit 630 then uses the HSV cluster image data (such as the hue and saturation values of the blocks in the cluster) as well as cluster sizes (or totaled data in the clusters) to calculate an error. For each image cluster, the GW-WB module 627, RGB to HSV convertor 628, and error unit 630 processes cluster of data of an input statistics, and outputs an error value for each cluster (and for each illuminant). Separately, a probability and confidence unit 632 also receives the cluster data from the block selection unit, and calculates a confidence value for each cluster by one example. The error unit 630 then uses the error values and corresponding confidence values to generate a weight (w1 to wL) for each initial (or candidate) LSC table assigned to each illuminant. A fusion unit 634 then adjusts the initial LSC table data by using the weight for the table, and then summing (or fusing) all of the LSC tables from all of the illuminants into a single composite LSC table. The fusion unit 634 may then output one final LSC table to the pre-processing unit 636 to adjust the pre-processed image data for lens shading color correction.

The pre-processed, LSC corrected image then may be provided, via the DS unit, to post-LSC processing 637 that may perform tasks such as noise reduction, pixel linearization, resolution reduction, Bayer demosaic, and/or vignette elimination as well as other tasks, and an encoder 638, which may compress the data for transmission in a bit stream or for storage on an image readable media.

By one option, the encoder 638 may have an inter-prediction unit 640 that generates motion vectors (MVs) to determine the motion of blocks from frame to frame in a video sequence of frames forming the images. In this case, the motion vectors, or the new locations for blocks in subsequent frames, may be provided to the block selection unit 626 so that the computational load for statistics is reduced. Also, a full search of the entire frame for clusters does not need to be performed for every frame (the term frame is used interchangeably with the term statistics herein). Thus, the block matching or selection unit 626 may only be used on every nth frame (every $10^{th}$, or $20^{th}$ for some non-limiting examples), or may be provided only on certain types of frames, such as only on P-frames (predicted frames —often from one previous frame), but by one example not on B-frames (predicted from both forward and back along a video sequence) or any other type of frame. By one approach, as explained below, motion vectors may be used to reduce the computational load for the search for at least some of the blocks in an image. In this case, the block searching may be limited to those images along a video sequence used for inter-prediction by an encoder. In other words, the images used by the encoder to determine the motion of a block from image to image. Many other examples are contemplated as long as the cost of searching for clusters on a frame is reduced. Thus, it may be possible to only search for a certain number of clusters on an image (such as one to three) and use MVs for the remaining clusters in the image, and so forth. For instance, there may only be an update on known clusters with MVs, or only update say 1-3 clusters out of a total of 6 clusters with MVs that represent frame the best (say those that contain largest amount of data), without carrying out a search procedure at all. In other words, the system applies MVs and does not search for new clusters in the next 5, 10, 20, or other interval of frames.

Figure 7:
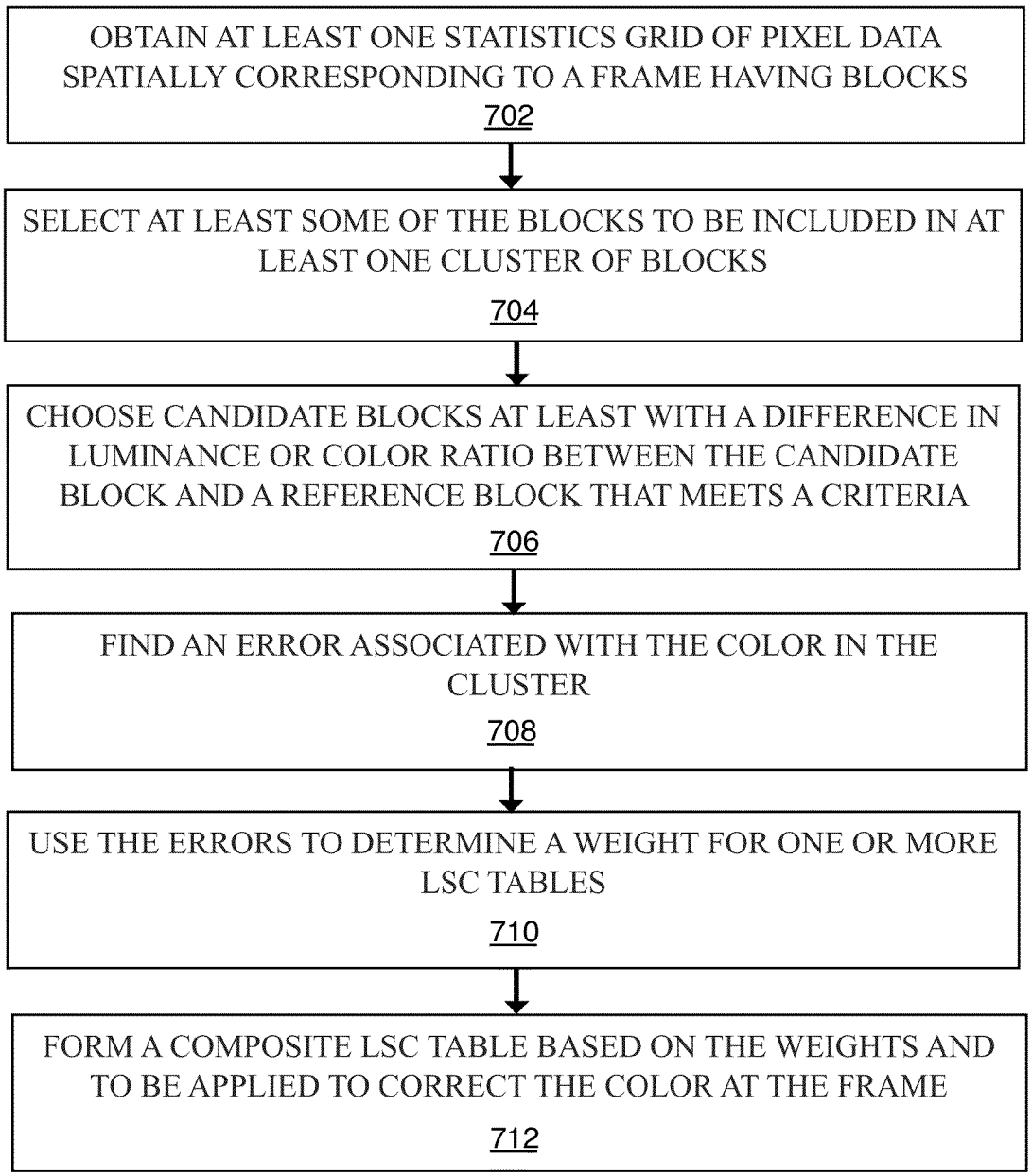
FIG. 7 is a flow chart showing a lens shading color correction process.

Referring now to FIG. 7, by one approach an example process 700 is a computer-implemented method of lens shading color correction with block matching that may be used to correct image data. In the illustrated implementation, process 700 may include one or more operations, functions or actions as illustrated by one or more of operations 702 to 712 numbered evenly. By way of non-limiting example, process 700 may be described herein with reference to example image capture devices 600 and 1300 of FIGS. 6 and 13 respectively, and where relevant.

Process 700 may include "obtain at least one statistics grid of pixel data spatially corresponding to a frame having blocks" 702. This process 700 also may comprise "select at least some of the blocks to be included in at least one cluster of blocks" 704. To assign blocks for the cluster, the process 700 may include "choose candidate blocks at least with a difference in luminance or color ratio between the candidate block and a reference block that meets a criteria" 706. As explained below, it does not matter where the blocks are located on the image, and whether or not the blocks are in contact with other blocks in the cluster. Also, by one example, the criteria may be one or more thresholds such as a Euclidean distance between block values as well as other criteria described below. The process 700 also may include "find an error associated with the color of the blocks in the cluster" 708. This error, also explained below, may be associated with the hue and saturation values within the blocks in the cluster as well as the area of the cluster. Process 700 may also include "use the errors to determine a weight for one or more LSC tables" 710 as well as "form a composite LSC table based on the weights and to be applied to correct the color at the frame" 712.

Figure 8:
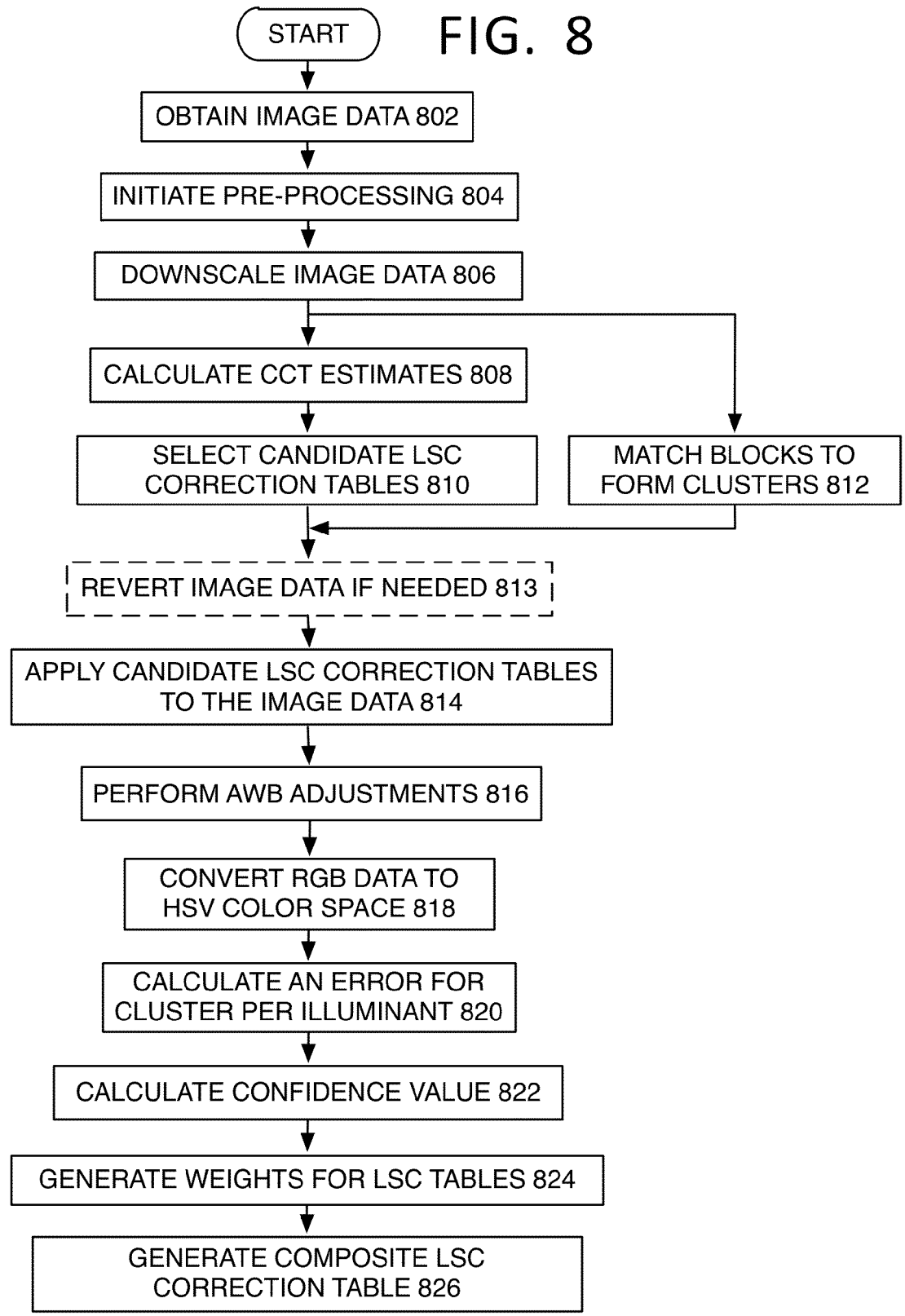
FIG. 8 is a flow chart of a detailed lens shading color correction process.

Referring now to FIG. 8, a more detailed lens shading color correction process 800 with block matching described herein is arranged in accordance with at least some implementations of the present disclosure. In the illustrated implementation, process 800 may include one or more operations, functions or actions as illustrated by one or more of operations 802 to 826 numbered evenly. By way of non-limiting example, process 800 will be described herein with reference to example image capture devices 600 and 1300 of FIGS. 6 and 13 respectively where relevant.

Process 800 may include "obtain image data" 802, and as explained above may include obtaining raw image data streamed from a camera module or other image capture module. The camera module, such as camera module 606, may be part of a single image capture device that includes the disclosed lens shading color correction system, or it may be remote from the disclosed system.

Process 800 may include "initiate pre-processing" 804. This may include black-level and lens shading corrections. The resolution reduction, AWB operations, RGB to HSV space conversion, and the lens shading color correction itself also may or may not be considered part of pre-processing by some examples. Where these operations are considered to be part of pre-processing, their operation may or may not be performed by a pre-processing control. As mentioned above, by one approach, only black-level correction is performed on an image being analyzed before the following lens shading color correction operations take place with regard to that image.

Process 800 may then include "downscale data" 806 to reduce the amount of image data to a uniform, controllable amount, such as a grid of data (corresponding to pixel locations) to form a 39×51 image for a smartphone for example. Such downscaling may be performed by using standard sampling techniques.

Process 800 may include "calculate CCT estimate" 808. As mentioned above, pre-processed image content may be obtained, and a set of initial or candidate LSC correction tables may be selected 810 for correcting a current image being analyzed. The candidate LSC tables may be selected by first analyzing image content and by calculating a probability CCT (PCCT) of presence of illuminant from a characterization database using sub-sampled input image data. To state it another way, in some implementations, a respective probability of presence may be calculated for each of a plurality of LSC tables, and the set of candidate LSC tables to be used going forward may comprise each LSC table among the plurality for which the probability of presence is greater than zero. In various such implementations, each chosen LSC table may correspond to a different respective illuminant, and the probability of presence for each LSC table may indicate a probability of presence of the illuminant to which that LSC table corresponds. It will be understood that many different variations or alternatives for the candidate LSC correction tables are contemplated. The selected set of LSC correction tables are then to be held or identified by initial LSC unit 624, and then weighted as described below for application to a current preprocessed image.

Separately from the selection of the candidate correction tables, blocks of the image data may be included in one or more clusters that represent smooth areas of the image, and are to be used in calculations going forward to generate a composite LSC correction table to be applied to the pre-processed images before the data is used for display or sent to an encoder for example. Thus, process 800 may include an operation of "match blocks to form clusters" 812. Process 900 described below is one possible example methodology for the matching of the blocks and generation of clusters. The output from this block matching process 900 may be data that includes the cluster sizes as well as the location of the pixels in each of the clusters. This cluster data then may be used to determine weights for the LSC tables as described below.

Figure 9A:
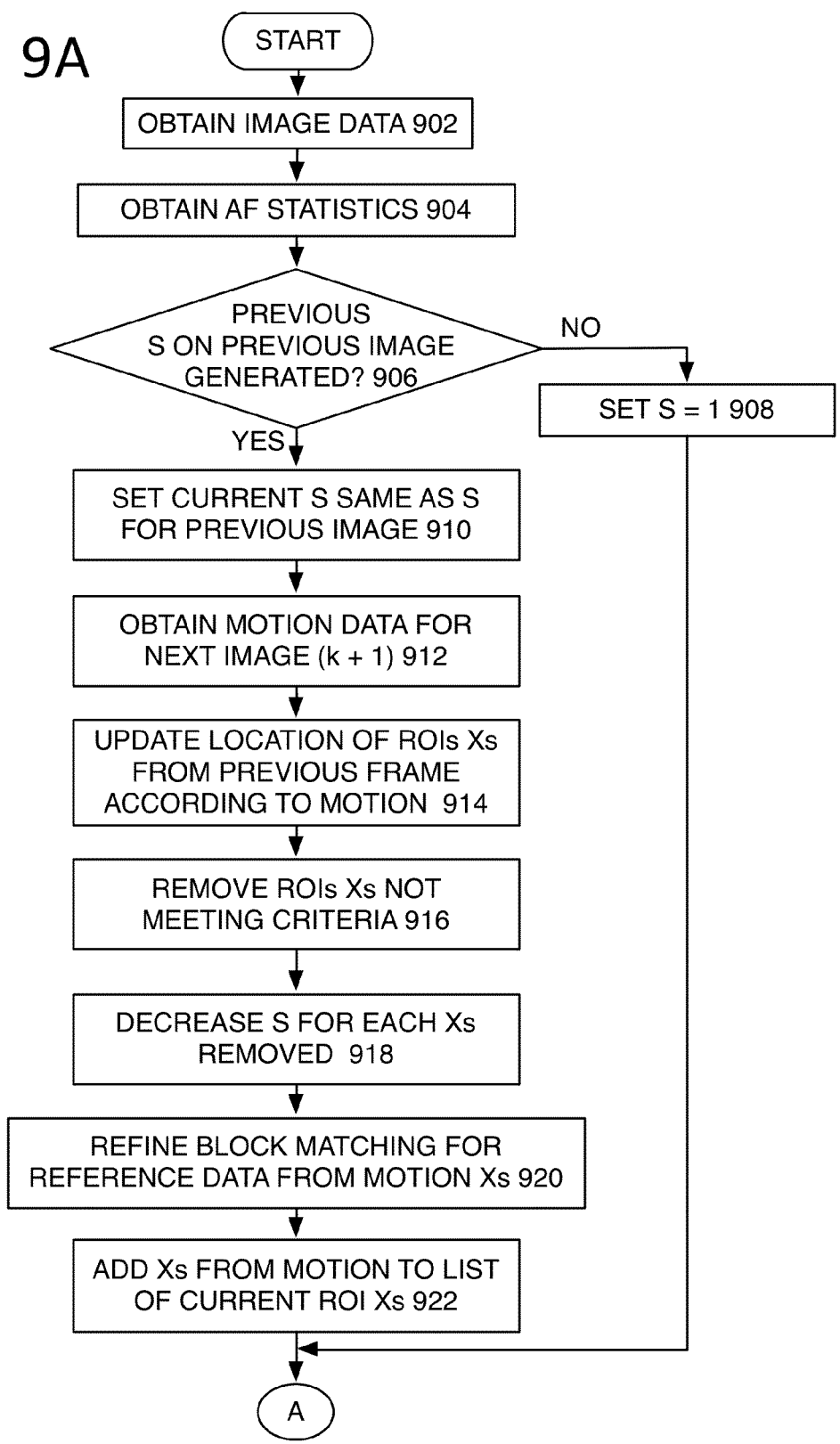
FIGS. 9A-9B is a flow chart of a block matching process for lens shading color correction.
Figure 9B:
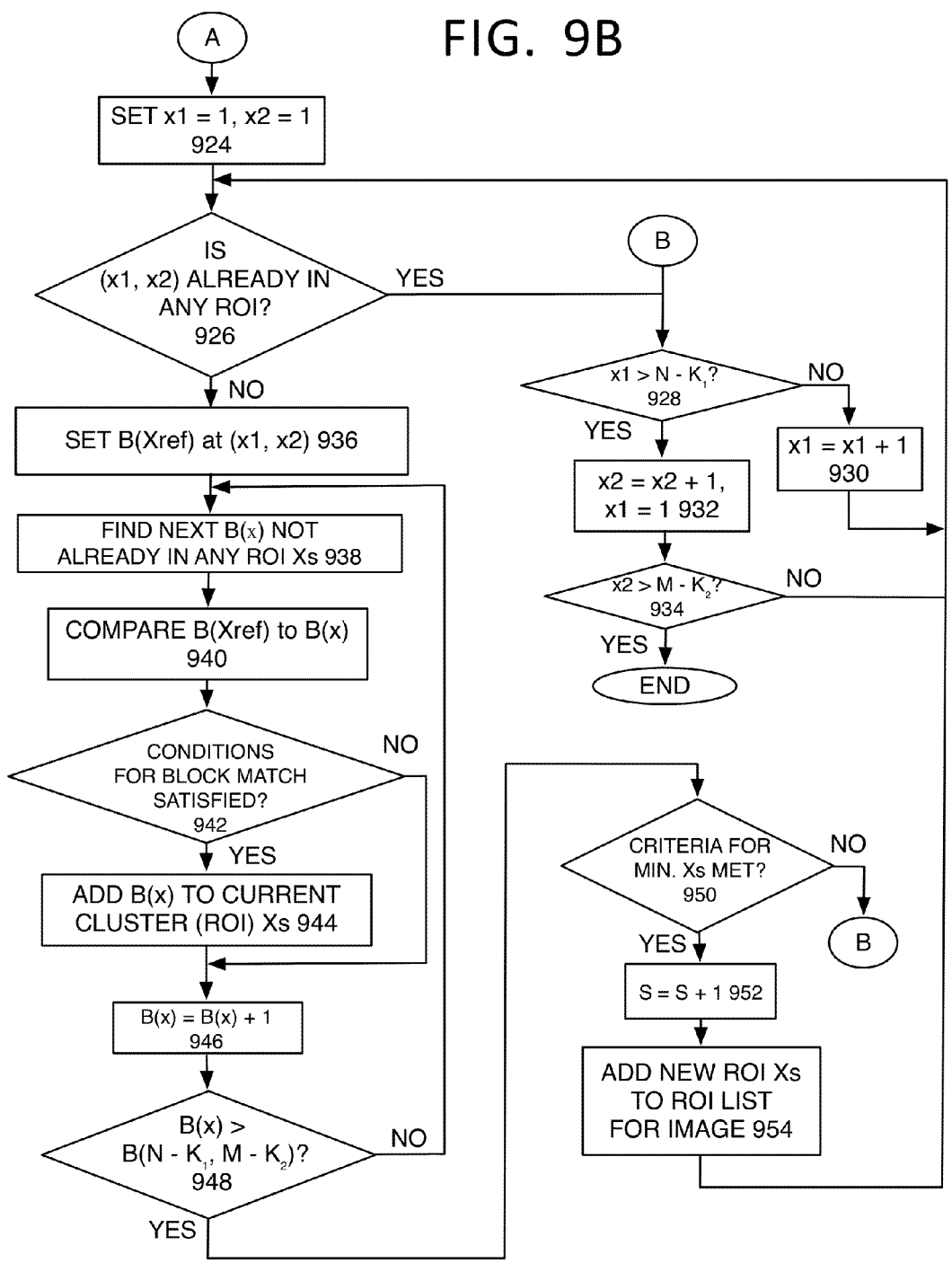

Referring to FIG. 9 to explain the block matching and generation of clusters in more detail, example process 900 is provided for selecting blocks to be included in a cluster to use the clusters, rather than an entire image, to perform lens shading color correction. This is accomplished by matching blocks for placement in clusters as described herein to provide a relatively high quality image. Process 900 is arranged in accordance with at least some implementations of the present disclosure. In the illustrated implementation, process 900 may include one or more operations, functions or actions as illustrated by one or more of operations 902 to 954 numbered evenly. By way of non-limiting example, process 900 will be described herein with reference to example image capture devices 600 and 1300 of FIGS. 6 and 13 respectively where relevant.

Process 900 may include "obtain image data" 902, where the at least partially pre-processed image data is provided to the block selection unit 626 for example. For this operation, let:

$$X=\{x=(x_1,x_2):x_1=1,\ldots,N,x_2=1,\ldots,M\} \quad (1)$$

be the set of coordinates where a statistics grid (and correction grid) is defined, and where each point on the statistics grid corresponds to a pixel of a downscaled image or frame of a video sequence being analyzed. Here, $x_1$ is the horizontal coordinate, while $x_2$ is the vertical coordinate on an image or grid of size (N, M). The statistics may be Bayer data, and comprises at least four-scaled Bayer color channels or elements $\{y_R, y_{G1}, y_{G2}, y_B\}$ associated with each point on the statistics grid, and in turn a single image pixel on a frame. By one example, the Bayer color elements are used to form a luminance channel y(x) for block matching analysis, while in other examples color ratios formed by using the Bayer color elements may be used for the block matching instead as explained below. If the sensor on the image capture device being used comprises other than Bayer layout or color filters, then correction grids may be adjusted accordingly and the process below still may apply.

When luminance values y(x) will be used instead of, or in addition to, the color ratios to determine block matching, process 900 also may include "obtain AF statistics" 904 when the AF statistics may be used to determine whether similarity conditions are met for inclusion of blocks in a cluster, and may include derivative values as explained below.

Figure 10:
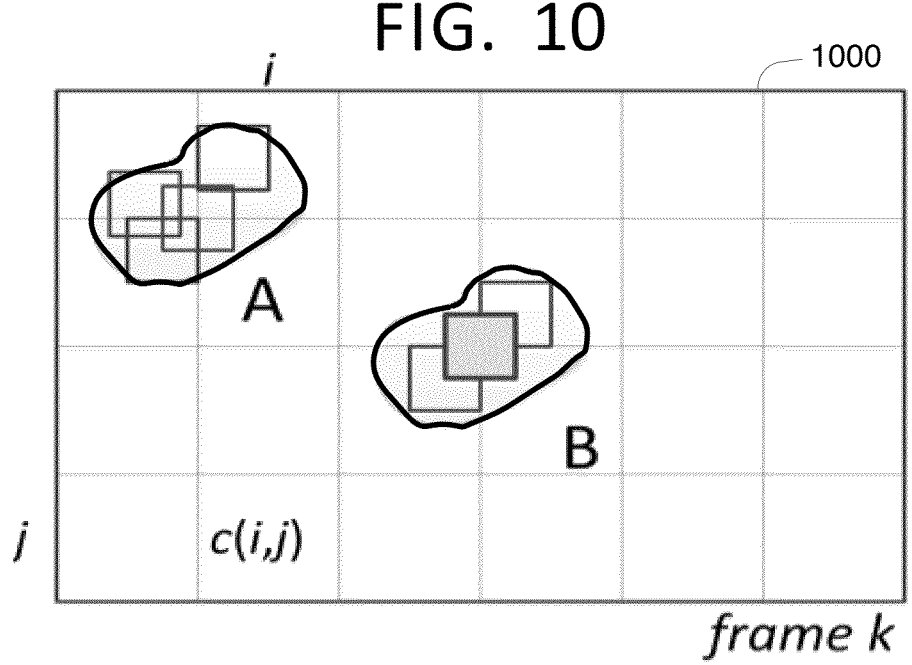
FIG. 10 is an illustration of an image with a cluster of blocks for lens shading color correction.

Referring to FIG. 10, an exemplary image (or statistics grid of image data such as luminance or color values) has a group A of pixels and a separate group B of pixels that may be placed together (union operation) in a single cluster or ROI or Xs. As mentioned above, each statistics grid may be divided into blocks that are 3×3 (or 4×4) pixels or points or other sizes that may or may not be consistent with block sizes used by an encoder analyzing the video sequence. Going forward the location of points on the statistics grid and corresponding pixel points (or image pixels) may be referred to interchangeability herein for simplicity. Each smooth area or data cluster (or just cluster) of pixels with similar properties found in the image and that is to be treated as a single cluster is called a region of interest (ROI) $X_s$. The union of blocks in area A and B on image (frame k) 1000 collectively are a single cluster or ROI $X_s$. The image, however, may have more than one ROI $X_s$. Thus, s=1 to S where S is the count of the number of clusters or the number of ROIs within an image. In other words, S may be much smaller than the total count of points in the statistics grid (S<<MN). Each ROI may be referred to as an ROI $X_s$, while the total number of ROIs or clusters in an image is S.

Referring to FIG. 9, process 900 then includes a check 906 whether a previous image has already been analyzed and has a defined number of clusters. The check operation 906 is performed to determine whether motion may be used to reduce the computational load of the bock matching. Specifically, since block matching and selection of blocks to place in clusters described herein is computationally extensive, especially when executing the block matching for each frame in a video sequence, a video encoding engine or video stabilization engine (encoder) can be used to provide motion vectors (MVs or $\Delta x$) to improve at least the initial approximation of the location of a region of interest (ROI) for a new frame k+1 as explained below.

Thus, this operation or check tests whether or not a previous image already has an established total S that would be relevant to the current image being analyzed. In some forms, the previous image may be an image k while the present image being analyzed is an image k+1. The previous image with S ROIs may be the adjacent previous image relative to the current image, or may be spaced along a video sequence a certain number of images away (or divided by certain types of images as already explained above). The spacing between images used for lens shading color correction may not be limited except that the previous image should have content that is still relevant to the current image being analyzed when motion data will be used to reduce the computational load of the block matching as explained below. Thus, in most cases, the previous image should be part of the same scene as the current image and within the video sequence being analyzed.

If there is no previous relevant image, such as for the first image in a video sequence or scene, then S is set to one (908), and the process continues without the use of motion data at operation 924 but may be implanted to analyze the subsequent images. Also, optionally, the process 900 may continue at operation 924 omitting the motion-based operations, when use of motion data is to be completely omitted for an entire video sequence or scene, for example.

When there is a previous image with an established S ROIs, and motion data will be used, then process 900 may include "set current S same as S for previous image" 910. Another way to say this is to set current image $S_{k+1}$=previous image $S_k$.

Figure 11:
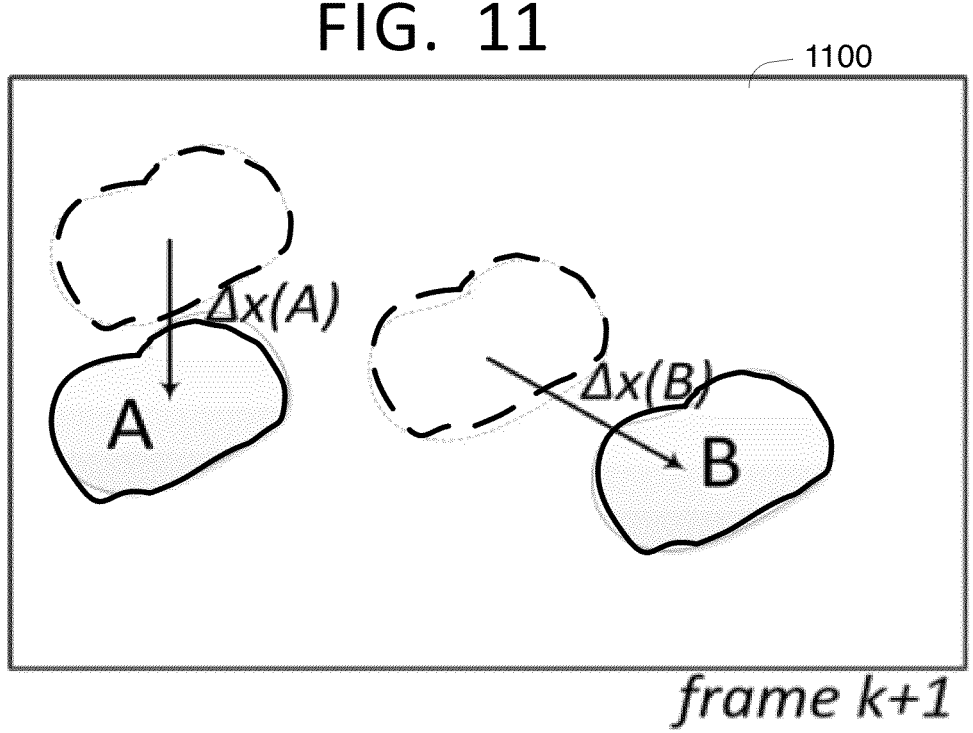
FIG. 11 is an illustration of an image with motion vectors to locate blocks for lens shading color correction.

Process 900 may then include "obtain motion data for next image (k+1)" 912. Particularly, the images may be divided into blocks, such as 3×3 or 4×4 pixel blocks or other sizes. An encoder processing the video sequence with the current image may be performing inter-prediction by generating motion vectors that indicate the motion of the blocks from one image to another image. Referring to FIG. 11, in the present example, the motion vectors must provide the motion of the blocks from the previous image that has the established S to the current image in order to form the initial S on the current image being analyzed. Also, by one form, the motion vectors (value that indicates change in position ($\Delta x$)) may be provided to the block selection unit 626 to calculate the current (or new) coordinates of the blocks in the current image, or otherwise the current block coordinates in the new image may be calculated by applying the motion vectors by the encoder for example, and the new coordinates are then provided to the block selection unit 626 instead of the vectors. As shown on image 1100, motion vectors $\Delta x(A)$ and $Ax(B)$ show the motion of block groups A and B from frame k to frame k+1.

Process 900 may then include "update location of ROIs Xs from previous frame according to motion" 914, and specifically, according to motion vectors of blocks or new motion coordinates of blocks obtained by applying the motion vectors. For instance, there may be a memory or buffer for the current image with a list or index that lists the current ROI found in the current image and providing the block locations that are assigned to each ROI Xs, thereby also indicating which image data (luminance, and color values) apply to those locations and are considered part of that ROI. Thus, the application of the motion vectors to find the new locations of the ROI Xs may be understood as:

$$X_s^{(k+1)}=\{x+\Delta x: x \in X_s^{(k)}, \Delta x \in \Delta X^{(k+1)}\} \qquad (2)$$

where image or frame k is the previous image, k+1 is the current image, $X_s$ for k-th iteration is denoted by $X_s^{(k)}$, and x is the horizontal and vertical coordinates (x1, x2) on a statistics grid or image, and that represents the location of a block (such as the upper left corner of a block) on a map of motion vectors $\Delta X^{(k+1)}$, and by one example, is assumed to be of the same size as a size of input statistics, where:

$$\Delta X^{(k+1)}=\{\Delta x=(\Delta(x_1), \Delta(x_2)): x_1=1, \ldots, N, x_2=1, \ldots, M\} \qquad (3)$$

where N, M are the size (and final coordinates) of the statistics grid (or image). Once the clusters or ROI Xs carried from the previous image are located on the new image, those ROI are maintained on the index or list of ROI for the current image.

Process 900 may then include "remove ROIs Xs not meeting criteria" 916. This includes removal of ROI that were completely eliminated from the previous image and did not carry over to the new image. Additionally, by one example, an ROI carried over from the previous image by motion data may only be set when the ROI meets minimum criteria. This may include a minimum size of the ROI such as a minimum number of blocks or minimum number of pixels (note that this may be regardless of the position of the block or pixel in the image as long as the other luminance or color value criteria below are met). Thus, by one example, the ROI is dropped for the current image if:

$$\#(X_s \cap \mathcal{B}(x_{ref})) < \# \mathcal{B}(x_{ref}), \qquad (4)$$

such that the total number of elements (#) (for example, the number of grid points or pixels) in the cluster or ROI Xs not including the reference block $B(x_{ref})$ is less than the number of elements (#) in the reference block $B(x_{ref})$ itself, then the ROI Xs has insufficient data to provide a significant contribution to the smooth area of the image to determine table weights. In these cases, process 900 may then include "decrease S for each Xs removed" 918 so that the total amount of ROIs S can be reduced, and the insufficient or missing Xs is then dropped from the index or list of ROI for the current frame.

Process 900 may comprise "refine block matching for reference data from motion Xs" 920. Particular, as mentioned, the $x_{ref}$ and Xs found by using the motion vectors (and/or all Xs defined for the image) may be considered as preliminary or initial locations. Thus, by one example, block matching calculations such as those described below are still carried out for the Xs for the current image established with motion data to make a more sure determination that the clusters or ROI are valid. Thus, the motion-based $B(x_{ref})$ is compared to each block B(x) in the image to determine if it meets the matching criteria described below. By one example, those blocks that do not meet the block matching criteria are discarded, and those that do meet the criteria area added. Once all available candidate blocks in the image are tested, the ROI still may be eliminated if it does not pass the size criteria mentioned above. If the ROI is still sufficiently large, it may remain on the ROI list for the current image except as redefined by the refinement process. By other examples, only those blocks in the motion-based ROI may be tested with the established motion-based $B(X_{ref})$ to define blocks to be taken out of, and blocks to remain in, the ROI. Many other examples are possible. By one alternative option, refinement block matching is omitted, and the established, carried-over ROI are assumed to be valid for table weight calculations without refinement. The identification of the ROI Xs established using the motion data is then saved, and specifically process 900 may comprise "add Xs from motion to list of current ROI Xs" 922.

The process 900 then may continue with operation 924 to establish new ROI for areas of the current image not already assigned to the motion-based ROI Xs. Particularly, for the present example, the reference point $X_{ref}$ defines the upper left corner of the reference block $B(x_{ref})$, and the grid or image point x defines the upper-left corner of the candidate blocks $B(x)$ that are to be tested for a match with the reference block.

By one approach both the reference block and the candidate blocks are in areas of the image not already in a cluster or ROI. One way to state that the reference block used to establish new ROI (also referred to as clustering) in an area not already within the Xs established by the motion data is to state that:

$$\mathcal{B}_{(x_{ref})} \in X - U_{i=1}^{s} X_s \quad (5)$$

or in other words, block matching for reference data is from the set X−UX$_s$ (NOT the union of all ROI X$_s$ already established). For refinement (operation 920) block matching is from a search for blocks $B(x)$ from each set $X_s^{(k+1)}$, s=1, . . . , S executing block matching in $X-U_{i=1} X_s$ only, i.e., where:

$$\mathcal{B}_{(x)} \in X - U_{i=1}^{s} X_s \text{ and } \mathcal{B}_{(x_{ref})} \in X_s \quad (6)$$

Thus, process 900 may include "Set x1=1, and x2=1" 924 to test the first location on the grid or image to determine whether the reference point $X_{ref}$ or $(x_{1,ref}, x_{2,ref})$ can be located at (1, 1). A check is then performed to determine whether point (x1, x2) is already located within any ROI 926. If not, reference block (or specifically its upper-left corner) $B(x_{ref})$ or $(x_{1,ref}, x_{2,ref})$ is set at (x1, x2), and the block matching process proceeds.

If (x1, x2) is already in a ROI, then process 900 performs a routine to check another point on the grid or image to be the reference point $(x_{1,ref}, x_{2,ref})$ (or anchor for the reference block $B(x_{ref})$). By one example, the reference point is searched and set in raster fashion starting from the upper-left of the image or grid and proceeding down the row to the right and starting at the left of the next lower row, and repeating until the entire image is searched. For example, a block size (for a reference block $B(x_{ref})$) may be (K1, K2) in pixels or grid points, and as mentioned above, the image size may be (N, M). The routine may include testing whether x1>N−K$_1$, or in other words whether the last block position along a row has been reached. If not, x1 is set to x1+1 (930), and (x1, x2) is retested for prior inclusion in an ROI (928). If the end of the row has been reached, x2 is set to the beginning of the next lower row (x2=x2+1 and x1=1) (932). This new position of x2 is then tested (x2>M−K$_2$) (934) to determine whether the last (or lower-most) row for a block position has been reached. If not, the new point (x1, x2) is retested for prior inclusion in an ROI. If it has been reached, then all of the possible reference blocks $B(x_{ref})$ already have been found, the block matching process is ended, and the process 900 continues with lens shading color correction process 800 (operation 814). It will be understood that many variations for setting $B(x_{ref})$ may be used, and by one example approach, the points or pixels around (x1, x2) that would be included in the reference block $B(x_{ref})$ also must be outside of any ROI for the reference block to be set at that location.

Once a point (x1, x2) that is not within an ROI has been found, $B(x_{ref})$ is set at (x1, x2), or particularly the upper-left corner is set at (x1, x2) (936). A similar operation then may be performed to find a next $B(x)$ not already in any ROI Xs (938) and to be included in the cluster of the $B(x_{ref})$. Similar to the search for the location of the reference block, the search for the candidate block may be performed in raster fashion from left to right along a row, and then downward row by row in the grid or image as well. Once each candidate block $B(x)$ is found, or when all of the possible $B(x)$ candidates are found in the entire image, the candidate blocks may be compared (940) to the reference block to determine whether a match exists.

The problem may be stated as to find all such clusters of data $X_s$ where X contains a sufficient amount of data to analyze and make a robust decision about which of predefined shading correction tables $T_l$, l=1, . . . , L provide the smallest color distortion in $X_s$ where l is the count of illuminants (light sources) detected in the image. For the sake of simplicity, shading correction table $T_l(x) = \{T_l^{Gr}(x), T_l^{R}(x), T_l^{B}(x), T_l^{Gb}(x)\}$, where x∈X, may be a combination of four correction grids, with one for each of the Bayer color channels.

By one option, the comparison may be based on luminance values forming the statistics grid mentioned above. To perform the matching calculations, let:

$$\mathcal{B}_{(x_{ref})} = \{x = (x_1, x_2) : x_1 = x_{1,ref}, \ldots, x_{1,ref} + K_1, x_2 = x_{2,ref}, \ldots, x_{2,ref} + K_2\} \quad (7)$$

where $x_{ref}(x_{1,ref}, x_{2,ref})$ is the reference point, and $K_1+1$ ($K_1 \geq 0$) and $K_2+1$ ($K_2 \geq 0$) are the dimensions of the block of coordinates $\mathcal{B}(\bullet)$, and $\mathcal{B}(x_{ref})$ is the reference block coordinates. Generally, two blocks $Y(\mathcal{B}(x_{ref}))$, and $Y(\mathcal{B}(x_{ref}))$ are called to be similar if the distance $d(Y(\mathcal{B}(x_{ref})), Y(B(x)))$ between these two blocks does not exceed threshold τ:

$$d(Y(\mathcal{B}(x_{ref})), Y(\mathcal{B}(x))) \leq \tau, \quad (8)$$

where $Y(\mathcal{B}(x))$ refers to a set, i.e., $Y(\mathcal{B}(x)) = \{y(x): x \in \mathcal{B}(x)\}$, while $y(x)$ is a scalar value of luminance. Distance d can be calculated as:

$$l_p \text{ metric } d_p(\alpha, \beta) = (\Sigma_{i=1}^{n} |\alpha_i - \beta_i|^p)^{1/p} \quad (9)$$

while using $l_2$ (i.e. p=2). Hence, for each point $x_{ref}, X_s$ can be defined as a union of at least two rectangular blocks of data, which are not necessarily connected (e.g., adjacent on the grid or image):

$$X_s = \mathcal{B}_{(x_{ref})} \cup U_x \mathcal{B}(x), \quad (10)$$

Thus, by this alternative, the similarity between blocks is determined by using $y(x)$ luminance values. In one example form, the similarity between the blocks, and in turn the inclusion of the block in a cluster, is established when all of the following conditions are satisfied, and which will be discussed in turn:

$$\begin{cases} x_{ref} \in X - \bigcup_{i=1}^{s-1} X_i, & (11) \\ d(Y(B(x_{ref})), Y(B(x))) \leq \tau, & (12) \\ \|Y'(B(x_{ref}))\| \leq \tau^1, & (13) \\ \|Y'(B(x))\| \leq \tau^1, & (14) \end{cases}$$

where $x \neq x_{ref}$.

Regarding equation (11), the first criteria, as mentioned above, is that at least the reference point, and by one approach the entire reference block anchored at that point, cannot already be located in a previously established cluster or ROI Xs.

Regarding equation (12), this is the Euclidean distance from eq. (9) above between the block at the reference point $B(x_{ref})$ and the candidate block $B(x)$ being analyzed for inclusion in the current cluster. If the distance is smaller than the threshold, then the candidate still may be included, and the next equation is checked. The threshold is set during system simulation and testing to achieve best performance. It shall be larger than 0 and lower than max value of y(x), or y'(x) respectively, normalized with respect to block B(x) size. Say for τ, it is assumed that difference equal to 10 between pixels is minor, and two blocks of data containing those pixels are 'similar'. Than a sum of squares of K elements of each pixels of value 10 is sqrt(sum(all K value of 10^2))=sqrt(K*10^2)= 10*sqrt(K) which is the threshold. The threshold is adjusted empirically until the best system performance is achieved.

Regarding both equations (13) and (14), one assumption imposed on y(x) is that it is locally smooth, meaning the function is differentiable in each point $x \in X_s$. By using the term differentiable, it is assumed that derivative of a function in point x exists and is bounded. At a minimum, there must be a first derivative where notation Y'(B•) denotes derivative y'(•) at each point in $\mathcal{B}(\bullet)$, is the $l_p$ norm, $\tau^1$ is the threshold limiting the first derivative, $X_0 \equiv \emptyset$ is an empty set, and respectively $Y_s = Y(X_s)$. It will be understood that the common derivative function may be:

$$y'(x_1,x_2) = y(x_1+1,x_2) - y(x_1,x_2) \quad (15)$$

calculated in horizontal direction, and similarly can be calculated in vertical direction, and that the function applies for both equations (13) and (14) (both the reference block and candidate block). Other types of derivative calculations that may be used include, Sobel, Prewitt, Laplacian, or other operators. The threshold $\tau^1$ is generated by using the same or similar process as that explained above for equation 12. Here, it is assumed that the system is robust when an edge is less than 5, or 20, and so forth, and the threshold is set at 5*sqrt (K). The threshold is then refined with testing.

The use of the derivative may be very efficient because AF statistics already provides a good approximation for y'(•). Hence, there may be no need to calculate the derivatives independently, and the derivatives may be obtained from the AF statistics. Also, $l_2$ norm for the derivative calculations is:

$$\|\alpha\| = (\Sigma_{i=1}^{n} |\alpha_i|^2)^{1/2} \quad (16)$$

similarly to $l_2$ distance d(•,•), while, it is worth to note, any norm may be equivalently efficient.

By another option, the block matching, and in turn statistics grid, may be based on color values, and particularly color ratios. Specifically, in the case when color ratios are used instead of luminance values, conditions for bock similarity are as follows in Eqs. (17) to (19):

$$\begin{cases} x_{ref} \in X - \bigcup_{i=1}^{s-1} X_i, & (17) \\ d(Y_{RG}(B(x_{ref})), Y_{RG}(B(x))) \leq \tau, & (18) \\ d(Y_{BG}(B(x_{ref})), Y_{BG}(B(x))) \leq \tau, & (19) \end{cases}$$

where equation (17) is similar to equation (11) above, and $x \neq x_{ref}$. Equations (18) and (19) are the Euclidean distances using color value ratios from the statistics grid or image data, such as:

$$Y_{RG}(B(\bullet)) = \left\{ \frac{y_R(x)}{y_G(x)} : x \in B(\bullet) \right\}, \text{ and} \quad (20)$$

$$Y_{RG}(B(\bullet)) = \left\{ \frac{y_R(x)}{y_G(x)} : x \in B(\bullet) \right\} \quad (21)$$

where the ratio $Y_{RG}$ denotes red $y_R$ over green $y_G$, and ratio $Y_{BG}$ is blue $y_B$ over green $y_G$ color ratios of input statistics, respectively. The thresholds for equations (18) and (19) are generated as explained above for luminance distance equation (12).

For the best performance of self-similarity criteria from equations (11) to (14) and (17) to (19), luminance values y and color ratios $$\frac{y_R}{y_G}, \frac{y_B}{y_G},$$

may be calculated pre-processed statistics, which by one example may be ISP statistics, where shading is corrected by a correction grid (or statistics grid also called a LSC correction table herein) stored in memory corresponding to a previous frame in a video stream, for example. In other words, while this system is operating for a video sequence with multiple frames, there will be a correction grid from a previous frame as well as multiple candidate correction grids for the current frame. Thus, the option exists to use the previous frame correction grid since illumination conditions should not usually change that quickly from single frame to single frame. It should be noted that while pre-processed image data with LSC correction may be used to calculate block similarities, the LSC correction tables (or correction grids) should be applied to raw image data only with black-level correction in order to perform the shading correction on the image data.

Each block $Y(\mathcal{B}(x_{ref}))$ (e.g. $\mathcal{B}(\bullet)$ of size 3×3 for example) is compared against other blocks of data $q(\mathcal{B}(x))$ with respect to a metric (Euclidean distance) d(•,•), as well as tested against the other criteria. If a result of the Euclidean metric is within a specified threshold, and all of the criteria mentioned above by one example are met, then two blocks are considered to be similar to each other, and a match is formed (942). In this case, at least supports or anchors of each block (sets of x coordinates where they are defined) are combined into a single ROI $X_s$, or in other words, the matched block B(x) is added to the current cluster (or ROI X) (944). The next block is found (B(x)=B(x)+1) (946), and it is tested whether it is past the last block position on the image (whether B(x)>B(N−K_1, M−K_2) (948). If not, the process 900 then returns to operation 938 to test to see if the new block position B(x) already is within an ROI, and if so finds the next block B(x) that is not in an ROI. Either way, the comparison loop between B($X_{ref}$) and the new B(x) is then performed as described above. Alternatively, if the last block position has been passed, all of the available candidate block positions have already been compared to the reference block B($X_{ref}$), and process 900 continues with an operation 950 to determine whether other minimum criteria for the ROI Xs, such as size criteria described above, have been met. If not, the present, new cluster or ROI Xs just assembled is dropped, and the process continues with operation 928 to select a new reference point $X_{ref}$ to start the matching loop over again. If the size criteria has been met, total S is ticked up by one (S=S+1) (952), and the new ROI Xs is added to the ROI list for the current image (954). The process then returns to operation 926 or 928 to choose a new Xref position and preform the matching loop again. This block-matching procedure may be carried out for each location:

$$x_{ref} \in \{x=(x_1,x_2): x_1=1,\ldots,N-K_1, x_2=1,\ldots,M-K_2\} \quad (22)$$

It will be understood that there may be many variations within the block matching process, and by one approach, as long as blocks are matched upon a criteria to form a cluster that does not have a limit of the location of the block within the image and relative to other blocks in the image. Also, a match may require some of the criteria, rather than all of the listed criteria, for either the luminance or color ratio options. Further, both options may be provided alternatively and selected based on a determination as to which option will provide a better result, or both options are performed and the best result is then used. Also, other color spaces may be used such that u and v components can be used after YUV transformation, or a and b components can be used after Lab transformation.

The output from the block matching operation 812 that includes the process 900, includes:

$$\text{clusters of data } Y_s = \{(y_R(x), y_{G1}(x), y_{G2}(x), y_B(x)): x \in X_s, s=1,\ldots,S\} \quad (23)$$

or in other words, identification of the cluster (or ROI Xs), the location of the blocks in each cluster, and the luminance, and/or the Bayer color values at the blocks within the cluster. It will be understood that with the identification of the block, the values related to that block may be looked-up in other locations on a memory, or the values may be collected onto a correction grid for fast retrieval during the LSC correction process.

It will be appreciated that there may be variations for the block selection and cluster generation than that provided by process 900, where such a process may not have all of the operations of process 900, and/or the order of the operations may be different.

Returning to the process 800, process 800 may include "Revert image data if needed" 813, and particularly, when the DS unit, or other unit providing the image data to the 3A unit, can only provide the LSC corrected image data, then that image data may be reverted back to non-LSC corrected image data, such as into black-level-only corrected raw image data. As an example, if shading correction for red color channel is $\hat{y}_R(x) = y_R(x) T^R(x)$ for all $x \in X$, where $y_R(\cdot)$ is black-level corrected input data and $T^R(\cdot)$ is the correcting function, then reverted correction for the red color channel is $y_R(x) = \hat{y}_R(x)/T^R(x)$ for all $x \in X$. As mentioned above, the reversion may be performed by the DS unit or other module. Process 800 then may include "apply selected candidate tables (Light 1, . . . , Light L) to the image data" 814, and by one example by an initial LSC unit 624. As mentioned, each illuminant (or light source) detected as possibly present for an image may have its own LSC table. Also, the candidate tables are applied to non-LSC corrected (or black-level corrected) image data.

Process 800 may then include "perform AWB adjustments" 816, and particularly to at least the image data within the defined clusters and with the initial LSC correction tables applied. By one approach, grey-world (GW-AWB) algorithms are applied, and process 800 then may include "convert RGB data to HSV color space" 818, which generates hue and saturation values for each of the points in the blocks in the clusters. Such GW-AWB corrections may be performed by the AWB module 627 and controlled by the AWB unit 614.

Process 800 may include "calculate an error for a cluster per illuminant" 820. Specifically, a respective set of error values may be determined for each of the set of LSC tables. For example, LSC correction unit 612 may be operative to determine a respective set of error values for each of a set of LSC tables 622 selected for the initial LSC table unit 624. In some implementations, each set of error values may describe error associated with application of its corresponding LSC table to the black-level corrected sensor image. In various implementations, the pre-processed image may be segmented into multiple clusters S of blocks as described above, and the set of error values for each LSC table may comprise a set of cluster error values, each block error value comprising an error value for one of the multiple clusters.

The error unit 630 may calculate one or more errors $e_{l,s}$ for each illuminant l in a cluster-wise manner for each cluster s that is a result of the block matching (or segmentation). The error unit 630 calculates errors $e_{l,s}$ in the HSV color space (e.g., via RGB to HSV unit 628) after application of a GW-AWB algorithm (e.g., via GW-AWB unit 627) with respect to origin of coordinates (0 hue and 0 saturation) using equation (24) as follows:

$$e_{l,s} = \frac{1}{A_s} \sqrt{\sum_i h_i^2 s_i^2}. \quad (24)$$

where here h is hue, s is saturation, $A_s$ is cluster size (as in the area of the cluster) measured by the number of pixels within the cluster or in other words #Xs. The l is an illuminant index. Value coordinates are ignored.

In various implementations, the reliabilities of errors $e_{l,s}$ may vary across the various clusters s of an image. For example, in some implementations, some clusters may be more affected by noise than other clusters. Such non-uniformity may affect and tend to be especially prevalent under certain conditions, such as low-light conditions, for example. The implementations are not limited in this context.

Process 800 also may include "calculate confidence value" 822, and by one example, performed by a probability and confidence unit 632. A confidence value $c_{l,s}$ (see equations 32 and 33 below) may be generated for each cluster s and for each illuminant 1. Specifically, a larger weight is given to an illuminant having a distribution concentrated around 0, therefore giving a smaller error with respect to origin, based on following probability equation:

$$P_{l,s} = \begin{cases} 1, & e_{l,s} \leq e_{min}, \\ \dfrac{e_{max} - e_l}{e_{max} - e_{min}}, & e_{min} < e_l < e_{max} \\ 0, & \text{otherwise,} \end{cases} \quad (25)$$

where $e_{min} = \min_l \{e_{l,s}\}$, $e_{max} = e_{l,s} *$tolerance, s is the cluster index, and tolerance is a relative constant representing how much error can be tolerated (e.g., a tolerance of 5% equals 1.05), or similar function not necessarily piece-wise linear, if computational resources allow.

Any particular image analyzed for lens shading color correction may be described as follows:

$$z(x) = k(x)y(x) + \sigma(k(x)y(x) + b)n + b, \quad (26)$$

where $x = (x_i, x_j)$ is a spatial coordinate on the image plane, $y(x)$ is a true expected unknown image value at spatial coordinate x, k is a two-dimensional grid of attenuation coefficients, n N(0,1) is a random white Gaussian noise of zero mean and unity standard deviation, b is the black level constant, and σ is a function of standard deviation for noise, such that std$\{z(x)\} = \sigma(y(x))$.

In order to obtain a best estimate of the true image values in a sub-region, a solution is sought in this form:

$$\tilde{y}(x) = F\{k^{-1}(x)(z(x)-b)\} \quad (27)$$

where $F\{\bullet\}$ is an operator that indicates both grey-world white-balance and color space transformation.

In order to account for varying reliabilities of values of $\tilde{y}(x)$ calculated for various spatial locations, reliability parameters $C(x)$ may be defined. In various implementations, values of $C(x)$ may be determined based on values of $Std(x)$, which may be calculated according to:

$$Std(x) = std\{H\{\tilde{y}(x)\}S\{\tilde{y}(x)\}\} \quad (28)$$

where $H\{\bullet\}$ indicates hue values, $S\{\bullet\}$ indicates saturation values, and std represents the standard deviation operator. In some cases, $\tilde{y}(x)$ may be highly non-linear, and thus formal calculated of $Std(x)$ may be computationally intensive. In some implementations, in order to conserve computational resources, $C(x)$ may be defined using fixed approximations of expected values for $Std(x)$. For example, in various implementations in which an image is divided into four rows and six columns of sub-clusters, a set $C$ of reliability parameters $C(x)$ may be used that takes the matrix form:

$$C = \{\hat{c}_{i,j}^{-1}\} = \begin{bmatrix} 256 & 4 & 2 & 2 & 4 & 256 \\ 16 & 2 & 1 & 1 & 2 & 16 \\ 16 & 2 & 1 & 1 & 2 & 16 \\ 256 & 4 & 2 & 2 & 4 & 256 \end{bmatrix} \quad (29)$$

where confidence $c_{l,s}$ in color deviation estimate $e_{l,s}$ in each $X_s$ is an important parameter that depends on spatial location confidence coefficient $\hat{c}_{ij}$ in each point $x \in X_s$ (see FIG. 10). The confidence coefficient $\hat{c}_{i,j}^{-1}$ represents the reciprocal of the coefficient to be used for the sub-cluster positioned in the $i^{th}$ row and $j^{th}$ column. In various implementations, the coefficients $C_{l,s}$ in equation (30) may be weighted using $c_{i,j}^{-1}$. In some implementations, the approximations used in such a set of reliability parameters may be empirically-based. For example, in various implementations, such approximations may be based on simulation results and/or tests performed on actual image sensor data. The implementations are not limited in this context. In some implementations, interpolation may be used for some points x in order to avoid abrupt changes in weighting when image framing is only slightly changed. It is to be understood that in various implementations, C may differ from the example in Equation (29), depending on the applicable attenuation factors and/or noise model. In some implementations, cluster sizes and shapes that are subject to segmentation may vary, but reliability parameters $C(x)$, similar to that illustrated in Equation (29), may be fixed and stored for a wide ranges of sensors and/or modules. The implementations are not limited in this context.

Thus, the matrix $C(x)$ is a deviation of distribution of hue and saturation calculated as sample quadratic error $e_{l,s}$ with respect to origin as in equation 26 within $X_s$ for each candidate correction grid $T_l(x)$. A larger amount of data points in $X_s$ results in a higher confidence $c_{l,s}$:

$$c_{l,s} = \frac{1}{NM} \# X_s p_{l,s} \sum_{x \in X_s} c(x), \quad (30)$$

where $c(x)$ is interpolated from $\hat{c}_{i,j}$ value in Eq. (31) at point $x \in X$, and $p_{l,s}$ is a function of $T_l(x)$ as in equations (33) to (35) below and within X.

Process 800 then may include "generate weights for LSC tables" 824, and particularly to determine a weight (w1 to wL as on FIG. 6) for individual selected candidate correction tables based on the weights and the confidence values. The weight calculations may be handled by the error unit 630 or the fusion unit 634 that will also generate the final composite LSC table, or it may be calculated by a separate weight generation unit. A respective weight may be determined for each of the set of LSC tables based on the corresponding set of error values for that LSC table. For example, a respective weight may be determined for each of a set of LSC tables shown at the LSC unit 624 and based on corresponding sets of error values for each of those LSC tables. In some implementations, a respective set of cluster weights may be calculated for each LSC table in the set, based on a corresponding set of cluster error values for that LSC table, and each cluster weight may correspond to one of the multiple clusters. In various implementations, the respective weight for each LSC table in the set may then be determined as a weighted sum of the cluster weights for that LSC table. In some such implementations, a set of reliability parameters may be identified for each of the multiple clusters, and the weighted sum of the set of cluster weights for each LSC table may be calculated by weighting the cluster weights according to the reliability parameters for their corresponding clusters. In various implementations, the reliability parameters may indicate levels of reliability for error values of their corresponding clusters. The implementations are not limited in this context.

Thus, individual table weights $w_l$ may be generated taking into account confidence $c_{l,s}$ parameters of all clusters or ROIs $X_s$, and color distortion estimates $e_{l,s}$ (for each candidate correction table $T_l$) may be calculated as follows:

$$\overline{w}_l = \sum_{s=1}^{S} c_{l,s} e_{l,s}^{-1} \quad (31)$$

$$w_l = \frac{\overline{w}_l}{\sum_{i=1}^{L} \overline{w}_i}, \quad (32)$$

Once the weight for each table $w_l$ is generated for each LSC table, process 800 may include "generate composite LSC correction table" 826. The composite LSC table may be generated for the pre-processed image based on the respective weights for the set of LSC tables, and by one example the fusion unit 634. In some implementations, the composite LSC table may be generated as a weighted sum of the set of LSC tables, based on the respective weights.

Final correction table T (x) is a weighted sum of candidate correction tables $T_l(x)$:

$$T(x) = \sum_{l=1}^{L} T_l(x) w_l, \quad (33)$$

The composite LSC table, or identification of the table, may be provided to the pre-processing unit 636 to be applied to the pre-processed image to generate a processed image. This may or may not be via encoder 638 in order to provide the image to a display device or compress the image for further transmission or for storage of the image. The implementations are not limited to these examples.

Figure 12:
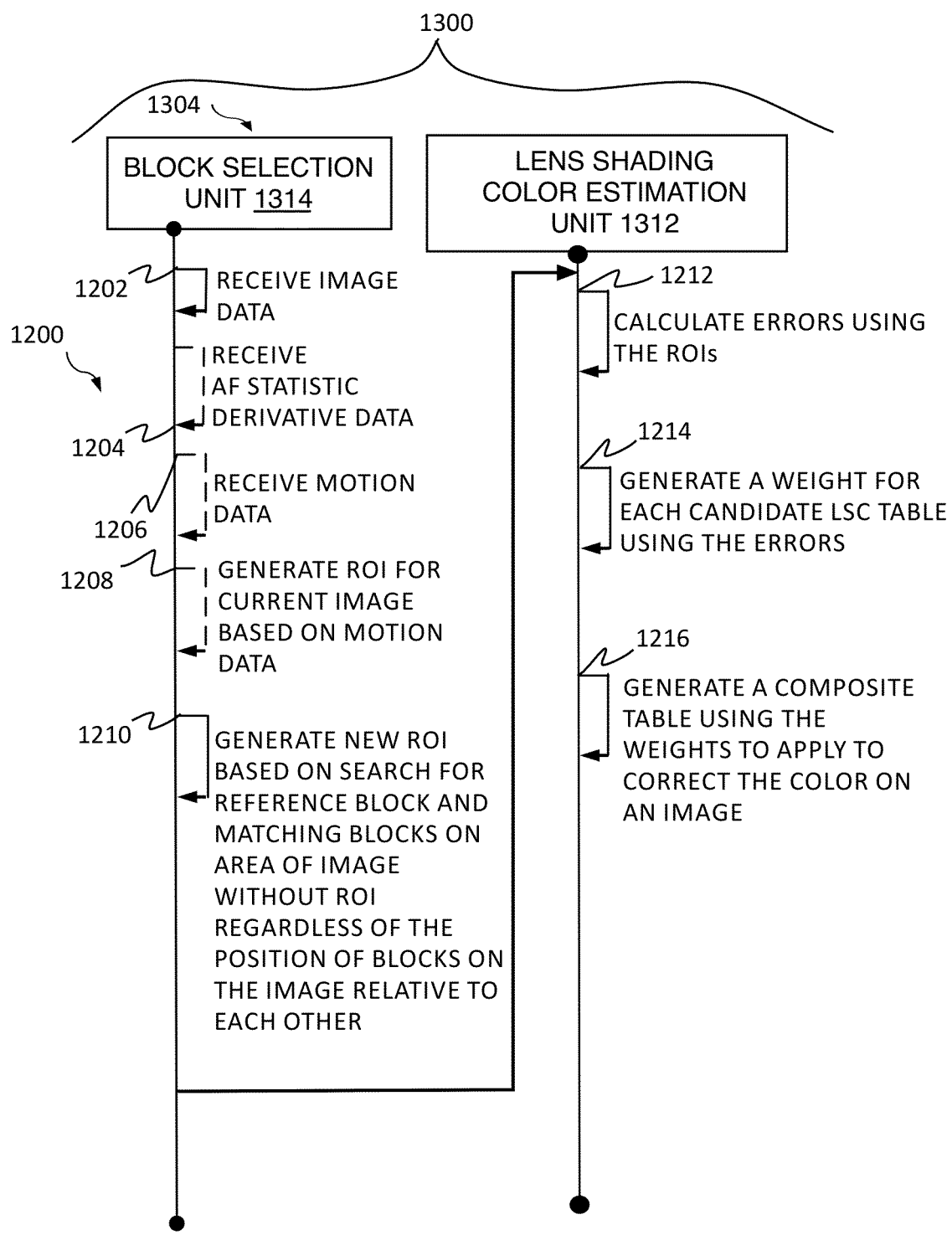
FIG. 12 is a diagram of an operation of an example system described herein.

Referring to FIG. 12, process 1200 illustrates the operation of a sample image processing system 1300 that performs lens shading color correction in accordance with at least some implementations of the present disclosure. In more detail, in the illustrated form, process 1200 may include one or more operations, functions or actions as illustrated by one or more of actions 1202 to 1216 numbered evenly. By way of non-limiting example, process 1200 will be described herein with reference to FIG. 13. Specifically, system 1300 includes logic units 1304 that has a 3A unit 1310 with a lens shading color (LSC) estimation component or unit 1312, and a block selection unit 1314. The operation of the system may proceed as follows.

Process 1200 may include "receive image data" 1202, and as explained above, it may be at least partially pre-processed image data, and it may be in the form of a statistics grid of luminance or color values (or color value ratios). The block selection unit may receive image data that is already LSC corrected in order to perform the block matching mentioned below, but the lens shading color estimation unit should receive non-LSC corrected image data for application of the candidate LSC tables. By one form, this latter image data is raw data that only received black-level correction so far.

Process 1200 may include "receive AF statistic derivative data" 1204, and particularly, point function derivatives when luminance values will be used to determine whether blocks match for inclusion of the block in a cluster. Specifically, candidate blocks must match a reference block for inclusion.

Process 1200 may include "receive motion data" 1206 when motion data, such as motion vectors, will be used to at least initially locate reference points or blocks on a current image by using the location of the reference blocks from a previous image in order to reduce the computational load of block matching.

Process 1200 may include "generate ROI for current image based on motion data". Thus, as explained herein, the motion data may be used to locate the reference points, and in turn the reference blocks, moved from a previous image, to establish regions of interest (ROI) or clusters, based on the previous image. By one form, the motion established ROI are assumed valid, and by another form, the motion established ROI are treated as preliminary where block matching comparisons are still performed to confirm the block membership of the motion-based ROI.

Process 1200 may include "generate new ROI based on search for reference block and matching blocks on area of image without ROI regardless of the position of blocks on the image relative to each other" 1210. Particular, as described above, the system may search for new ROI in areas of the image that are not already covered by an ROI, whether motion-based ROI or not by one example. Also, the inclusion in clusters may be based on properties such as luminance and color values rather than any limit to which part of the image the blocks are located or their position relative to the position of other blocks. This refers to the fact that criteria for the comparisons do not specifically mention a block position or location on the image or relative to other blocks (other than not already being within an ROI).

Once the ROI are established for an image, the identification of the ROI and block membership within the ROI may be provided on a list of ROI for the current image in a memory. This list or index is then made available for the lens shading color estimation unit. Ultimately, the process 1200 then may "calculate errors using the ROIs", and based on candidate LSC tables applied to raw image data that may be pre-processed by black-level correction, and is then by at least basic WB correction and conversion to HSV color space as explained above. By one example, errors are based on hue and saturation values as well as the area of the cluster or ROI, also as explained above with equation (24). Process 1200 then may include "generate a weight for each candidate LSC table using the errors" 1214, and particularly to sum up weights from the individual clusters or ROI on an image to have a single weight for each candidate LSC table which may be provided for each illuminant. Process 1200 than may include "generate a composite table using the weights to apply to correct the color on an image" 1216, and particularly to determine a single LSC correction table for the current image as described in detail above. The correction table then may be applied to the pre-processed image data before providing the image data to an encoder, storing the data, transmitting the data, and/or displaying the image.

In addition, any one or more of the operations of FIGS. 1-12 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 13:
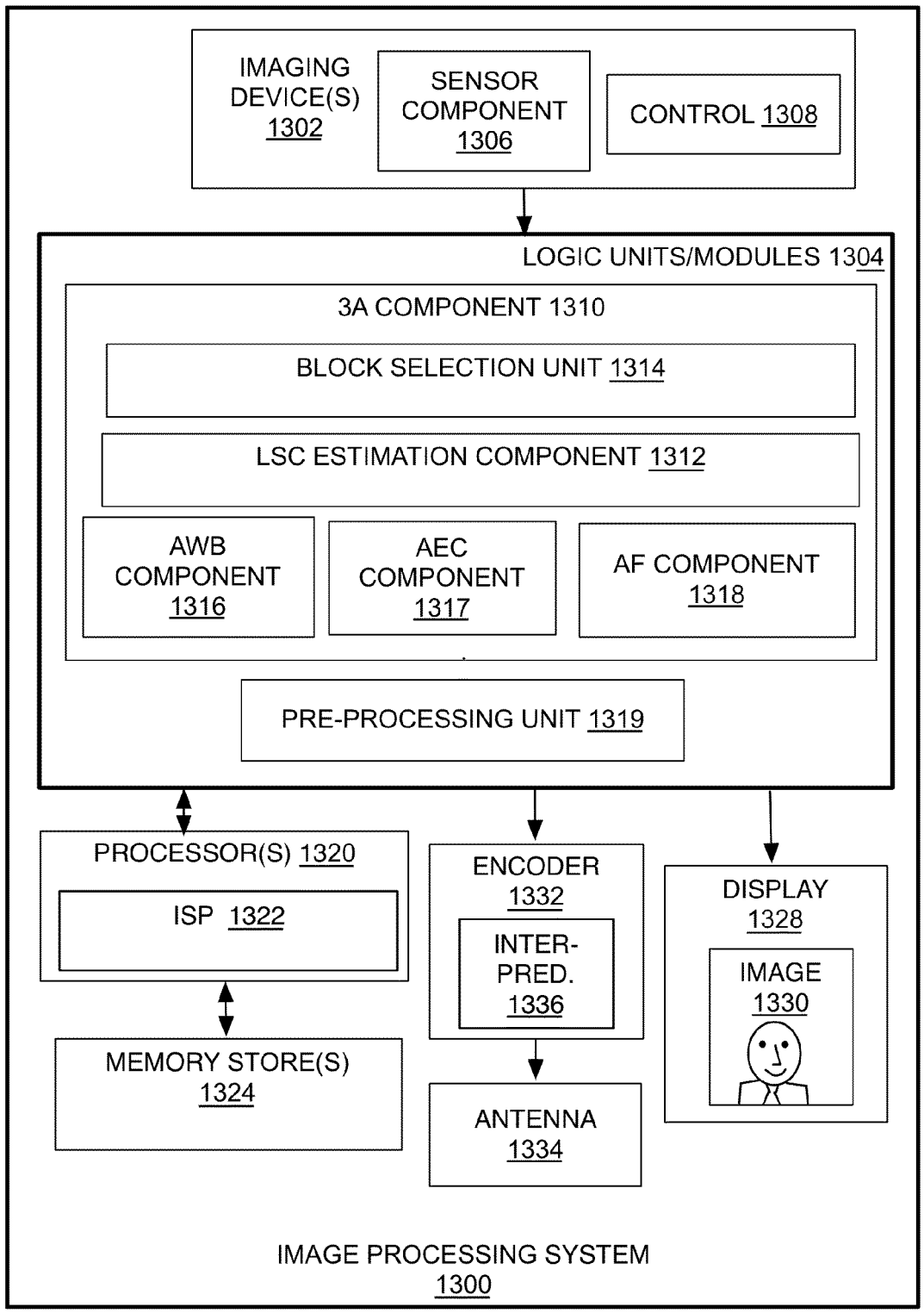
FIG. 13 is an illustrative diagram of an example system.

Referring to FIG. 13, an example image processing system 1300 is arranged in accordance with at least some implementations of the present disclosure. In various implementations, the example image processing system 1300 may have an imaging device 1302 to form or receive captured image data. This can be implemented in various ways. Thus, in one form, the image processing system 1300 may be a digital camera or other image capture device, and imaging device 1302, in this case, may be the camera hardware and camera sensor software, module, or component. In other examples, imaging processing system 1300 may have an imaging device 1302 that includes or may be a camera, and logic modules 1304 may communicate remotely with, or otherwise may be communicatively coupled to, the imaging device 1302 for further processing of the image data.

In either case, such technology may include a camera such as a digital camera system, a dedicated camera device, or an imaging phone, whether a still picture or video camera or some combination of both. Thus, in one form, imaging device 1302 may include camera hardware and optics including one or more sensors as well as auto-focus, zoom, aperture, ND-filter, auto-exposure, flash, and actuator controls. These controls may be part of a sensor module or component 1306 for operating the sensor. The sensor component 1306 may be part of the imaging device 1302, or may be part of the logical modules 1304 or both. Such sensor component can be used to generate images for a viewfinder and take still pictures or video. The imaging device 1302 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera and/or microphone-array might be used in addition to or in the alternative to a camera sensor. In some examples, imaging device 1302 may be provided with an eye tracking camera. The imaging device 1302 also may have a lens actuator or control 1308 that has a lens and a lens driver or driver logic that receives commands to move the lens and applies an electrical current to move the lens.

In the illustrated example, the logic modules 1304 may include the 3A component that, in turn, may include an AF component 1318 to compute a desired new current lens position, an automatic white balance (AWB) component 1316, and an automatic exposure control (AEC) component 1317. The 3A component unit 1310 also may have a lens shading color (LSC) correction/table component 1312 which in turn may have a block selection unit 1314 that performs many of the operations described herein. The 3A component unit 1310 may be operated by, or even entirely or partially located at, processor(s) 1320, and which may include an ISP 1322 to perform the operations. The logic modules may be communicatively coupled to the components of the imaging device 1302 in order to receive raw image data. In these cases, it is assumed the logic modules 1304 are considered to be separate from the imaging device. This need not be so, and the logic modules very well may be considered to be part of the imaging device as well.

The image processing system 1300 may have one or more processors 1320 which may include a dedicated image signal processor (ISP) 1322 such as the Intel Atom, memory stores 1324 which may or may not hold the LSC tables and other LSC correction data, one or more displays 1328 to provide images 1330, encoder 1332 that has an inter-prediction unit 1336 to provide motion data such as motion vectors for example, and antenna 1334. In one example implementation, the image processing system 1300 may have the display 1328, at least one processor 1320 communicatively coupled to the display, at least one memory 1324 communicatively coupled to the processor to perform the operations described herein as explained above. The encoder 1332 and antenna 1334 may be provided to compress the modified image date for transmission to other devices that may display or store the image as well as provide the motion data for block matching. It will be understood that the image processing system 1300 may also include a decoder (or encoder 1332 may include a decoder) to receive and decode image data for processing by the system 1300. Otherwise, the processed image 1330 may be displayed on display 1328 or stored in memory 1324. As illustrated, any of these components may be capable of communication with one another and/or communication with portions of logic modules 1304 and/or imaging device 1302. Thus, processors 1320 may be communicatively coupled to both the image device 1302 and the logic modules 1304 for operating those components. By one approach, although image processing system 1300, as shown in FIG. 13, may include one particular set of blocks or actions associated with particular components or modules, these blocks or actions may be associated with different components or modules than the particular component or module illustrated here.

Figure 14:
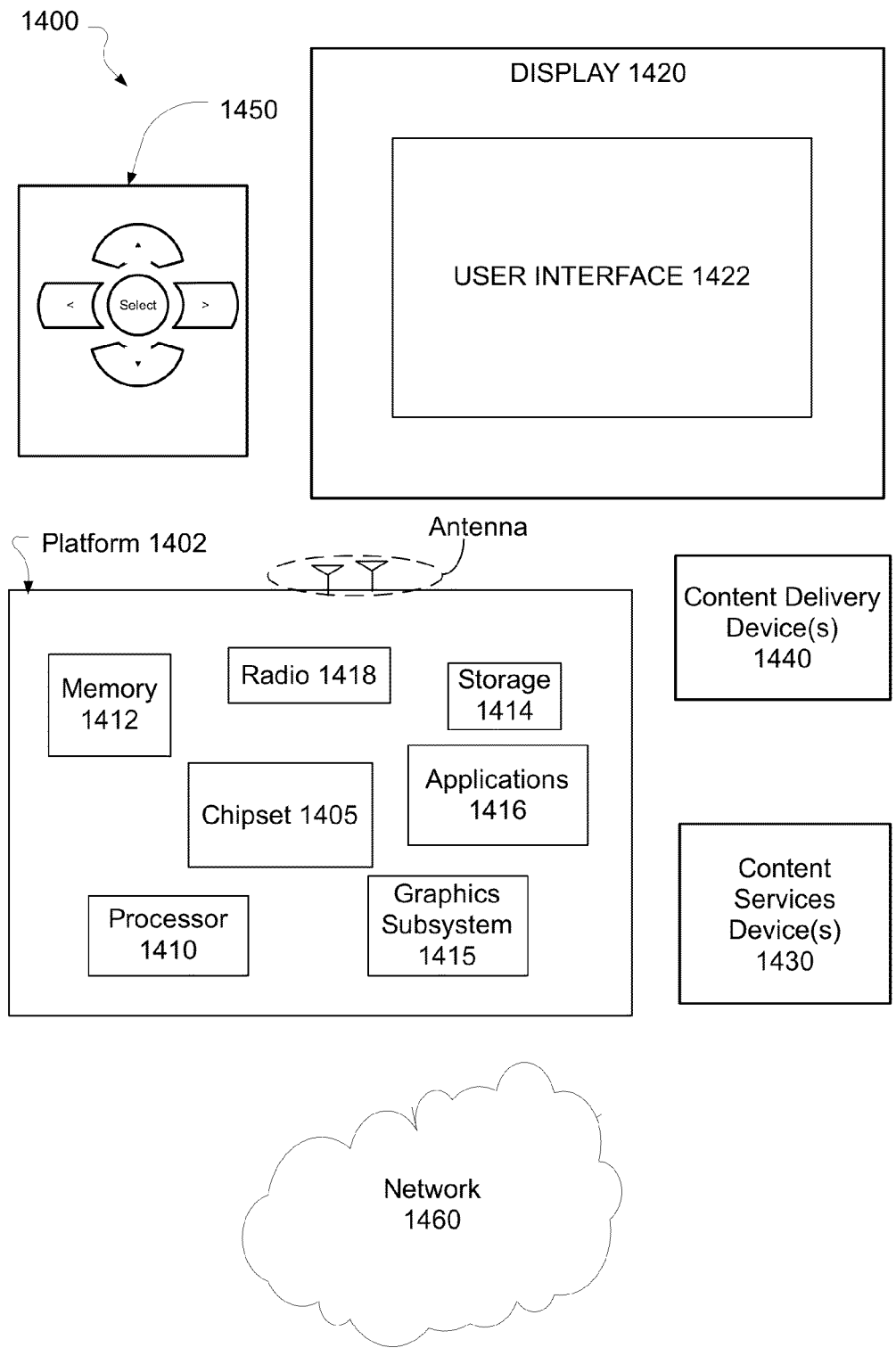
FIG. 14 is an illustrative diagram of another example system.

Referring to FIG. 14, an example system 1400 in accordance with the present disclosure operates one or more aspects of the image processing system described herein. It will be understood from the nature of the system components described below that such components may be associated with, or used to operate, certain part or parts of the image processing system described above. In various implementations, system 1400 may be a media system although system 1400 is not limited to this context. For example, system 1400 may be incorporated into a digital still camera, digital video camera, mobile device with camera or video functions such as an imaging phone, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1400 includes a platform 1402 coupled to a display 1420. Platform 1402 may receive content from a content device such as content services device(s) 1430 or content delivery device(s) 1440 or other similar content sources. A navigation controller 1450 including one or more navigation features may be used to interact with, for example, platform 1402 and/or display 1420. Each of these components is described in greater detail below.

In various implementations, platform 1402 may include any combination of a chipset 1405, processor 1410, memory 1412, storage 1414, graphics subsystem 1415, applications 1416 and/or radio 1418. Chipset 1405 may provide intercommunication among processor 1410, memory 1412, storage 1414, graphics subsystem 1415, applications 1416 and/or radio 1418. For example, chipset 1405 may include a storage adapter (not depicted) capable of providing intercommunication with storage 1414.

Processor 1410 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1410 may be dual-core processor(s), dual-core mobile processor(s), and so forth.

Memory 1412 may be implemented as a volatile memory device such as, but not limited to, a Random Access Memory (RAM), Dynamic Random Access Memory (DRAM), or Static RAM (SRAM).

Storage 1414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1414 may include technology to increase the storage performance enhanced protection for valuable digital media when multiple hard drives are included, for example.

Graphics subsystem 1415 may perform processing of images such as still or video for display. Graphics subsystem 1415 may be a graphics processing unit (GPU) or a visual processing unit (VPU), for example. An analog or digital interface may be used to communicatively couple graphics subsystem 1415 and display 1420. For example, the interface may be any of a High-Definition Multimedia Interface, Display Port, wireless HDMI, and/or wireless HD compliant techniques. Graphics subsystem 1415 may be integrated into processor 1410 or chipset 1405. In some implementations, graphics subsystem 1415 may be a stand-alone card communicatively coupled to chipset 1405.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1418 may operate in accordance with one or more applicable standards in any version.

In various implementations, display 1420 may include any television type monitor or display. Display 1420 may include, for example, a computer display screen, touch screen display, video monitor, television-like device, and/or a television. Display 1420 may be digital and/or analog. In various implementations, display 1420 may be a holographic display. Also, display 1420 may be a transparent surface that may receive a visual projection. Such projections may convey various forms of information, images, and/or objects. For example, such projections may be a visual overlay for a mobile augmented reality (MAR) application. Under the control of one or more software applications 1416, platform 1402 may display user interface 1422 on display 1420.

In various implementations, content services device(s) 1430 may be hosted by any national, international and/or independent service and thus accessible to platform 1402 via the Internet, for example. Content services device(s) 1430 may be coupled to platform 1402 and/or to display 1420. Platform 1402 and/or content services device(s) 1430 may be coupled to a network 1460 to communicate (e.g., send and/or receive) media information to and from network 1460. Content delivery device(s) 1440 also may be coupled to platform 1402 and/or to display 1420.

In various implementations, content services device(s) 1430 may include a cable television box, personal computer, network, telephone, Internet enabled devices or appliance capable of delivering digital information and/or content, and any other similar device capable of unidirectionally or bidirectionally communicating content between content providers and platform 1402 and/display 1420, via network 1460 or directly. It will be appreciated that the content may be communicated unidirectionally and/or bidirectionally to and from any one of the components in system 1400 and a content provider via network 1460. Examples of content may include any media information including, for example, video, music, medical and gaming information, and so forth.

Content services device(s) 1430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1402 may receive control signals from navigation controller 1450 having one or more navigation features. The navigation features of controller 1450 may be used to interact with user interface 1422, for example. In implementations, navigation controller 1450 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1450 may be replicated on a display (e.g., display 1420) by movements of a pointer, cursor, focus ring, or other visual indicators displayed on the display. For example, under the control of software applications 1416, the navigation features located on navigation controller 1450 may be mapped to virtual navigation features displayed on user interface 1422, for example.

In implementations, controller 1450 may not be a separate component but may be integrated into platform 1402 and/or display 1420. The present disclosure, however, is not limited to the elements or in the context shown or described herein.

In various implementations, drivers (not shown) may include technology to enable users to instantly turn on and off platform 1402 like a television with the touch of a button after initial boot-up, when enabled, for example. Program logic may allow platform 1402 to stream content to media adaptors or other content services device(s) 1430 or content delivery device(s) 1440 even when the platform is turned "off." In addition, chipset 1405 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1400 may be integrated. For example, platform 1402 and content services device(s) 1430 may be integrated, or platform 1402 and content delivery device(s) 1440 may be integrated, or platform 1402, content services device(s) 1430, and content delivery device(s) 1440 may be integrated, for example. In various implementations, platform 1402 and display 1420 may be an integrated unit. Display 1420 and content service device(s) 1430 may be integrated, or display 1420 and content delivery device(s) 1440 may be integrated, for example. These examples are not meant to limit the present disclosure.

In various implementations, system 1400 may be implemented as a wireless system, a wired system, or a combination of both. When implemented as a wireless system, system 1400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 14.

Figure 15:
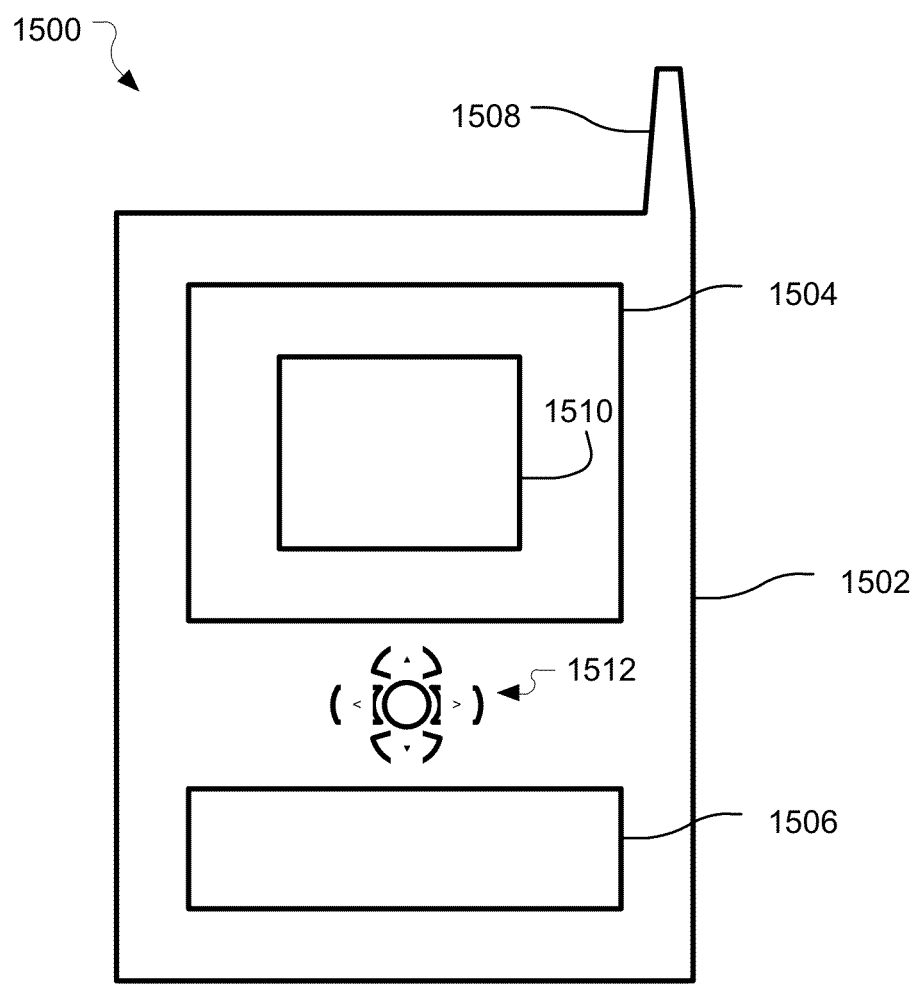
FIG. 15 illustrates another example device, all arranged in accordance with at least some implementations of the present disclosure.

Referring to FIG. 15, a small form factor device 1500 is one example of the varying physical styles or form factors in which system 1400 may be embodied. By this approach, device 1500 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 15, device 1500 may include a housing 1502, a display 1504 including a screen 1510, an input/output (I/O) device 1506, and an antenna 1508. Device 1500 also may include navigation features 1512. Display 1504 may include any suitable display unit for displaying information appropriate for a mobile computing device. I/O device 1506 may include any suitable I/O device for entering information into a mobile computing device. Examples for I/O device 1506 may include an alphanumeric keyboard, a numeric keypad, a touch pad, input keys, buttons, switches, rocker switches, microphones, speakers, voice recognition device and software, and so forth. Information also may be entered into device 1500 by way of microphone (not shown). Such information may be digitized by a voice recognition device (not shown). The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method of lens shading color correction, comprises obtaining at least one statistics grid of pixel data spatially corresponding to a frame having blocks, and selecting at least some of the blocks to be included in at least one cluster of blocks, and comprising choosing candidate blocks at least with a difference in luminance or color ratio between the candidate block and a reference block that meets a criteria. The method also may comprise finding an error associated with the color in the cluster; using the errors to determine a weight for one or more LSC tables; and forming a composite LSC table based on the weights and to be applied to correct color at the frame.

By another implementation, the method may comprise at least one of: (1) the criteria indicates a more constant color in an area on the frame, and wherein the criteria is a threshold of a maximum change in color ratio, and (2) the criteria indicates smoothness in an area of the frame, and wherein the criteria is a first threshold of a maximum change in luminance, and wherein a block is selected for inclusion in the cluster when the first threshold is met and when the luminance function at the location of the block has a derivative that is less than a second threshold. Otherwise, the method may comprise obtaining the derivatives from autofocus statistics, wherein blocks are included in the cluster regardless of the position of the block on the frame and the position relative to the position of other blocks on the frame, wherein selecting comprises selecting a reference block and comparing multiple blocks in the frame to the reference block and that are not already considered part of any cluster, and wherein the difference is calculated as a Euclidean distance by differencing pixel values of corresponding pixel positions within the two blocks being compared.

By other approaches, the method also may comprise providing color correction for at least one frame in a video sequence of frames comprising using motion vectors and using the motion vectors to form clusters on the current image, wherein pixel data of blocks on the frame that are not within the cluster are not used to calculate color errors for lens shading color correction, wherein a reference point on the statistics grid is selected by searching for a point row-by-row and that is not already in a cluster, wherein the error and table weight calculations are performed on a cluster-by-cluster basis rather than a block-by-block basis, and wherein the luminance or color ratio image data used to compare candidate blocks to a reference block is obtained from already lens-shading-color (LSC) corrected data, and wherein forming the final composite LSC table is based on NON-LSC corrected data.

By yet another implementation, a computer-implemented system has of a display, at least one processor communicatively coupled to the display, at least one memory communicatively coupled to at least one processor and storing image capture data of at least one frame of a video sequence or at least one still photograph, and at least one lens shading correction (LSC) unit communicatively coupled to the processor. The at least one lens shading correction unit is provided to obtain at least one statistics grid of pixel data spatially corresponding to a frame having blocks, select blocks to be included in at least one cluster of the blocks and comprising choosing candidate blocks at least with a difference in luminance or color ratio between the candidate block and a reference block that meets a criteria, find an error associated with the color in the cluster, use the errors to determine a weight for one or more LSC tables, and form a composite LSC table based on the weights and to be applied to correct color at the frame.

By another example, the system includes wherein at least one of: (1) the criteria indicates a more constant color in an area on the frame, and wherein the criteria is a threshold of a maximum change in color ratio, and (2) the criteria indicates smoothness in an area of the frame, and wherein the criteria is a first threshold of a maximum change in luminance, and wherein a block is selected for inclusion in the cluster when the first threshold is met and when the luminance function at the location of the block has a derivative that is less than a second threshold. Otherwise, the system provides the at least one LSC correction unit to obtain the derivatives from autofocus statistics, wherein blocks are included in the cluster regardless of the position of the block on the frame and the position relative to the position of other blocks on the frame, wherein selecting comprises selecting a reference block and comparing multiple blocks in the frame to the reference block and that are not already considered part of any cluster, and wherein the difference is calculated as a Euclidean distance by differencing pixel values of corresponding pixel positions within the two blocks being compared.

By other approaches, the system provides the at least one LSC correction unit to provide color correction for at least one frame in a video sequence of frames comprising using motion vectors and using the motion vectors to form clusters on the current image, wherein pixel data of blocks on the frame that are not within the cluster are not used to calculate color errors for lens shading color correction, wherein a reference point on the statistics grid is selected by searching for a point row-by-row and that is not already in a cluster, wherein the error and table weight calculations are performed on a cluster-by-cluster basis rather than a block-by-block basis, and wherein the luminance or color ratio image data used to compare candidate blocks to a reference block is obtained from already lens-shading-color (LSC) corrected data, and wherein forming the final composite LSC table is based on NON-LSC corrected data.

By one approach, at least one computer readable medium comprises a plurality of instructions that in response to being executed on a computing device, causes the computing device to: obtain at least one statistics grid of pixel data spatially corresponding to a frame having blocks, select blocks to be included in at least one cluster of the blocks and comprising choosing candidate blocks at least with a difference in luminance or color ratio between the candidate block and a reference block that meets a criteria, find an error associated with the color in the cluster, use the errors to determine a weight for one or more LSC tables, and form a composite LSC table based on the weights and to be applied to correct color at the frame.

By another approach, the instructions cause the computing device to use at least one of: (1) the criteria indicates a more constant color in an area on the frame, and wherein the criteria is a threshold of a maximum change in color ratio, and (2) the criteria indicates smoothness in an area of the frame, and wherein the criteria is a first threshold of a maximum change in luminance, and wherein a block is selected for inclusion in the cluster when the first threshold is met and when the luminance function at the location of the block has a derivative that is less than a second threshold. Otherwise, the instructions cause the computing device to obtain the derivatives from autofocus statistics, wherein blocks are included in the cluster regardless of the position of the block on the frame and the position relative to the position of other blocks on the frame, wherein selecting comprises selecting a reference block and comparing multiple blocks in the frame to the reference block and that are not already considered part of any cluster, and wherein the difference is calculated as a Euclidean distance by differencing pixel values of corresponding pixel positions within the two blocks being compared.

By other approaches, the instructions cause the computing device to provide color correction for at least one frame in a video sequence of frames comprising using motion vectors and using the motion vectors to form clusters on the current image, wherein pixel data of blocks on the frame that are not within the cluster are not used to calculate color errors for lens shading color correction, wherein a reference point on the statistics grid is selected by searching for a point row-by-row and that is not already in a cluster, wherein the error and table weight calculations are performed on a cluster-by-cluster basis rather than a block-by-block basis, wherein the luminance or color ratio image data used to compare candidate blocks to a reference block is obtained from already lens-shading-color (LSC) corrected data, and wherein forming the final composite LSC table is based on NON-LSC corrected data.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of lens shading color correction, comprising:
obtaining at least one statistics grid of pixel data spatially corresponding to a frame having blocks;
selecting at least some of the blocks to be included in at least one cluster of blocks, and comprising choosing candidate blocks at least with a difference in luminance or color ratio between the candidate block and a reference block that meets a criteria;
finding an error associated with the color in the cluster;
using the errors to determine a weight for one or more LSC tables; and
forming a composite LSC table based on the weights and to be applied to correct color at the frame.

2. The method of claim 1 wherein the criteria indicates a more constant color in an area on the frame, and wherein the criteria is a threshold of a maximum change in color ratio.

3. The method of claim 1 wherein the criteria indicates smoothness in an area of the frame, and wherein the criteria is a first threshold of a maximum change in luminance, and wherein a block is selected for inclusion in the cluster when the first threshold is met and when the luminance function at the location of the block has a derivative that is less than a second threshold.

4. The method of claim 3 comprising obtaining the derivatives from autofocus statistics.

5. The method of claim 1 wherein blocks are included in the cluster regardless of the position of the block on the frame and the position relative to the position of other blocks on the frame.

6. The method of claim 1 wherein selecting comprises selecting a reference block and comparing multiple blocks in the frame to the reference block and that are not already considered part of any cluster.

7. The method of claim 1 wherein the difference is calculated as a Euclidean distance by differencing pixel values of corresponding pixel positions within the two blocks being compared.

8. The method of claim 1 comprising providing color correction for at least one frame in a video sequence of frames comprising using motion vectors and using the motion vectors to form clusters on the current image.

9. The method of claim 1 wherein pixel data of blocks on the frame that are not within the cluster are not used to calculate color errors for lens shading color correction.

10. The method of claim 1 wherein a reference point on the statistics grid is selected by searching for a point row-by-row and that is not already in a cluster.

11. The method of claim 1 wherein the error and table weight calculations are performed on a cluster-by-cluster basis rather than a block-by-block basis.

12. The method of claim 1 wherein the luminance or color ratio image data used to compare candidate blocks to a reference block is obtained from already lens-shading-color (LSC) corrected data, and wherein forming the final composite LSC table is based on NON-LSC corrected data.

13. The method of claim 1 wherein at least one of:
the criteria indicates a more constant color in an area on the frame, and wherein the criteria is a threshold of a maximum change in color ratio, and
the criteria indicates smoothness in an area of the frame, and wherein the criteria is a first threshold of a maximum change in luminance, and wherein a block is selected for inclusion in the cluster when the first threshold is met and when the luminance function at the location of the block has a derivative that is less than a second threshold, and
the method comprising obtaining the derivatives from autofocus statistics;

wherein blocks are included in the cluster regardless of the position of the block on the frame and the position relative to the position of other blocks on the frame;
wherein selecting comprises selecting a reference block and comparing multiple blocks in the frame to the reference block and that are not already considered part of any cluster;
wherein the difference is calculated as a Euclidean distance by differencing pixel values of corresponding pixel positions within the two blocks being compared;
the method comprising providing color correction for at least one frame in a video sequence of frames comprising using motion vectors and using the motion vectors to form clusters on the current image;
wherein pixel data of blocks on the frame that are not within the cluster are not used to calculate color errors for lens shading color correction;
wherein a reference point on the statistics grid is selected by searching for a point row-by-row and that is not already in a cluster;
wherein the error and table weight calculations are performed on a cluster-by-cluster basis rather than a block-by-block basis; and
wherein the luminance or color ratio image data used to compare candidate blocks to a reference block is obtained from already lens-shading-color (LSC) corrected data, and wherein forming the final composite LSC table is based on NON-LSC corrected data.

14. A computer-implemented system of lens shading color correction comprising:
a display;
at least one processor communicatively coupled to the display;
at least one memory communicatively coupled to at least one processor and storing image capture data of at least one frame of a video sequence or at least one still photograph; and
at least one lens shading correction (LSC) unit communicatively coupled to the processor, and to:
  obtain at least one statistics grid of pixel data spatially corresponding to a frame having blocks;
  select blocks to be included in at least one cluster of the blocks and comprising choosing candidate blocks at least with a difference in luminance or color ratio between the candidate block and a reference block that meets a criteria;
  find an error associated with the color in the cluster;
  use the errors to determine a weight for one or more LSC tables; and
  form a composite LSC table based on the weights and to be applied to correct color at the frame.

15. The system of claim 14 wherein the criteria indicates a more constant color in an area on the frame, and wherein the criteria is a threshold of a maximum change in color ratio.

16. The system of claim 14 wherein the criteria indicates smoothness in an area of the frame, and wherein the criteria is a first threshold of a maximum change in luminance, and wherein a block is selected for inclusion in the cluster when the first threshold is met and when the luminance function at the location of the block has a derivative that is less than a second threshold.

17. The system of claim 14 wherein blocks are included in the cluster regardless of the position of the block on the frame and the position relative to the position of other blocks on the frame.

18. The system of claim 14 wherein selecting comprises selecting a reference block and comparing multiple blocks in the frame to the reference block and that are not already considered part of any cluster.

19. The system of claim 14 comprising the LSC unit to provide color correction for at least one frame in a video sequence of frames comprising using motion vectors used for video data compression and using the motion vectors to form clusters on the current image.

20. The system of claim 14 wherein at least one of:
the criteria indicates a more constant color in an area on the frame, and wherein the criteria is a threshold of a maximum change in color ratio, and
the criteria indicates smoothness in an area of the frame, and wherein the criteria is a first threshold of a maximum change in luminance, and wherein a block is selected for inclusion in the cluster when the first threshold is met and when the luminance function at the location of the block has a derivative that is less than a second threshold, and
the system wherein the LSC unit to obtain the derivatives from autofocus statistics;
wherein blocks are included in the cluster regardless of the position of the block on the frame and the position relative to the position of other blocks on the frame;
wherein selecting comprises selecting a reference block and comparing multiple blocks in the frame to the reference block and that are not already considered part of any cluster;
wherein the difference is calculated as a Euclidean distance by differencing pixel values of corresponding pixel positions within the two blocks being compared;
the system wherein the LSC unit to provide color correction for at least one frame in a video sequence of frames comprising using motion vectors and using the motion vectors to form clusters on the current image;
wherein pixel data of blocks on the frame that are not within the cluster are not used to calculate color errors for lens shading color correction;
wherein a reference point on the statistics grid is selected by searching for a point row-by-row and that is not already in a cluster;
wherein the error and table weight calculations are performed on a cluster-by-cluster basis rather than a block-by-block basis; and
wherein the luminance or color ratio image data used to compare candidate blocks to a reference block is obtained from already lens-shading-color (LSC) corrected data, and wherein forming the final composite LSC table is based on NON-LSC corrected data.

21. At least one computer readable article comprising a plurality of instructions that in response to being executed on a computing device, causes the computing device to:
obtain at least one statistics grid of pixel data spatially corresponding to a frame having blocks;
select blocks to be included in at least one cluster of the blocks and comprising choosing candidate blocks at least with a difference in luminance or color ratio between the candidate block and a reference block that meets a criteria;
find an error associated with the color in the cluster;
use the errors to determine a weight for one or more LSC tables; and
form a composite LSC table based on the weights and to be applied to correct color at the frame.

22. The article of claim 21 wherein the criteria indicates a more constant color in an area on the frame, and wherein the criteria is a threshold of a maximum change in color ratio.

23. The article of claim 21 wherein the criteria indicates smoothness in an area of the frame, and wherein the criteria is a first threshold of a maximum change in luminance, and wherein a block is selected for inclusion in the cluster when the first threshold is met and when the luminance function at the location of the block has a derivative that is less than a second threshold.

24. The article of claim 21 wherein blocks are included in the cluster regardless of the position of the block on the frame and the position relative to the position of other blocks on the frame; and wherein select comprises selecting a reference block and comparing multiple blocks in the frame to the reference block and that are not already considered part of any cluster.

25. The article of claim 21 wherein at least one of:

the criteria indicates a more constant color in an area on the frame, and wherein the criteria is a threshold of a maximum change in color ratio, and the criteria indicates smoothness in an area of the frame, and wherein the criteria is a first threshold of a maximum change in luminance, and wherein a block is selected for inclusion in the cluster when the first threshold is met and when the luminance function at the location of the block has a derivative that is less than a second threshold, and the article wherein the instructions cause the computing device to obtain the derivatives from autofocus statistics;

wherein blocks are included in the cluster regardless of the position of the block on the frame and the position relative to the position of other blocks on the frame;

wherein selecting comprises selecting a reference block and comparing multiple blocks in the frame to the reference block and that are not already considered part of any cluster;

wherein the difference is calculated as a Euclidean distance by differencing pixel values of corresponding pixel positions within the two blocks being compared;

the article wherein the instructions cause the computing device to provide color correction for at least one frame in a video sequence of frames comprising using motion vectors and using the motion vectors to form clusters on the current image;

wherein pixel data of blocks on the frame that are not within the cluster are not used to calculate color errors for lens shading color correction;

wherein a reference point on the statistics grid is selected by searching for a point row-by-row and that is not already in a cluster;

wherein the error and table weight calculations are performed on a cluster-by-cluster basis rather than a block-by-block basis; and wherein the luminance or color ratio image data used to compare candidate blocks to a reference block is obtained from already lens-shading-color (LSC) corrected data, and wherein forming the final composite LSC table is based on NON-LSC corrected data.

\* \* \* \* \*